(12) United States Patent
Watanabe et al.

(10) Patent No.: US 10,871,927 B2
(45) Date of Patent: Dec. 22, 2020

(54) IMAGE FORMING APPARATUS

(71) Applicant: Oki Data Corporation, Tokyo (JP)

(72) Inventors: Keisuke Watanabe, Tokyo (JP); Masao Yaji, Tokyo (JP); Syuhei Mitani, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 16/654,161

(22) Filed: Oct. 16, 2019

(65) Prior Publication Data

US 2020/0133593 A1   Apr. 30, 2020

(30) Foreign Application Priority Data

Oct. 29, 2018   (JP) .................. 2018-202986

(51) Int. Cl.
*H04N 1/00* (2006.01)
*G06F 3/12* (2006.01)

(52) U.S. Cl.
CPC .......... *G06F 3/1221* (2013.01); *G06F 3/1229* (2013.01); *G06F 3/1293* (2013.01); *G06F 3/1298* (2013.01); *H04N 1/00885* (2013.01); *H04N 1/00904* (2013.01)

(58) Field of Classification Search
CPC .......... H04N 1/00904; H04N 1/00901; H04N 1/00885; H04N 1/00217; G06F 3/1221; G06F 3/1229; G06F 3/1236; G06F 3/1285; G06F 3/1293; G06F 3/1296; G06F 3/1297; G06F 1/32
USPC ....... 358/1.11–1.18; 713/300, 320, 323, 324, 713/330; 718/1, 100, 104
See application file for complete search history.

(56) References Cited

U.S. PATENT DOCUMENTS

| 7,843,953 | B2 * | 11/2010 | Kawata | ............. G03G 15/5004 370/419 |
| 2005/0216776 | A1 * | 9/2005 | Watanabe | ............. G06F 1/3209 713/300 |
| 2010/0128305 | A1 * | 5/2010 | Kawata | ................... H04L 69/16 358/1.15 |

(Continued)

FOREIGN PATENT DOCUMENTS

JP   2012-179788 A   9/2012

*Primary Examiner* — Chad Dickerson
(74) *Attorney, Agent, or Firm* — Muncy, Geissler, Olds & Lowe, P.C.

(57) ABSTRACT

An image forming apparatus includes a power supply part that supplies electronic power in two different power modes (first and second modes), a communication part that includes a transmitting and receiving part that receives a network packet in the both modes, and a determination part that stores filter information and determines whether or not the network packet matches one of filter settings, a determination control part that performs a rewrite operation to repeatedly rewrite the filter information while running in the second mode, a power supply control part that transits the power mode of the power supply part from the second mode to the first mode based on a determination result of the determination part, a packet transmitting and receiving part that receives the network packet supplied from the transmitting and receiving part in the first mode and stops an operation of itself in the second mode, and an image forming part stops an operation of itself in the second mode.

14 Claims, 21 Drawing Sheets

(56) References Cited

U.S. PATENT DOCUMENTS

| | | | | |
|---|---|---|---|---|
| 2011/0208986 A1* | 8/2011 | Soga | ................ | G03G 15/5083 |
| | | | | 713/323 |
| 2012/0224206 A1* | 9/2012 | Takahashi | ............. | G06F 3/1221 |
| | | | | 358/1.13 |
| 2013/0212418 A1* | 8/2013 | Ueda | ....................... | G06F 1/263 |
| | | | | 713/323 |
| 2016/0078332 A1* | 3/2016 | Omodaka | ............ | G06K 15/405 |
| | | | | 358/1.14 |

* cited by examiner

Fig. 4

| Network Packet P | | | Filter info. | | Filter Setting FIL | | | |
|---|---|---|---|---|---|---|---|---|
| Function | Action | Comment | A | B | Dst_MAC | Type | Prot | Dst_Port |
| ICMP | PING Request | No Re-Trns. | O | O | Unicast | IP (0x8000) | ICMP (1) | Don't care |
| Bonjour | Bonjour | No Re-Trns. | O | O | Multicast | IP (0x8000) | UDP (17) | mDNS |
| SNMP | MIB Acquisition Request | No Re-Trns. | O | O | Unicast | IP (0x8000) | UDP (17) | SNMP (161) |
| NBT | Search Request For Terminals etc. | No Re-Trns. | O | O | Broadcast | IP (0x8000) | UDP (17) | NBT (137) |
| DHCP | Renewal Request For Leasing Term | No Re-Trns. | O | O | Unicast | IP (0x8000) | UDP (17) | DHCP (68) |
| HTTP | Request For WEB Page | | O | | Unicast | IP (0x8000) | TCP (6) | HTTP (80) |
| HTTPS | Request For WEB Page | | O | | Unicast | IP (0x8000) | TCP (6) | HTTPS (443) |
| FTP | File Transfer Request | | O | | Unicast | IP (0x8000) | TCP (6) | FTP (21) |
| Telnet | Terminal Connection Request | | | O | Unicast | IP (0x8000) | TCP (6) | Telnet (23) |
| LPR | Print Request in LPR | | | O | Unicast | IP (0x8000) | TCP (6) | LPR (515) |
| RAW | Print Request in Standard TCp/IP (RAW) | | | O | Unicast | IP (0x8000) | TCP (6) | RAW (910) |

Fig. 5

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0x00 | 00 | 80 | 87 | 00 | 00 | 01 | 00 | 80 | 87 | 00 | 00 | 02 | 80 | 00 | 45 | ... |
| 0x10 | ... | ... | ... | ... | ... | ... | ... | 08 | ... | ... | ... | ... | ... | ... | ... | ... |
| 0x20 | ... | ... | ... | ... | 02 | 03 | ... | ... | ... | ... | ... | ... | ... | ... | ... | ... |

Dst_MAC, Dst_Port, Prot, Type

Fig. 6A

| Filter Setting FIL | | | | Action |
|---|---|---|---|---|
| Dst_MAC | Type | Prot | Dst_Port | |
| Unicast | IP (0x8000) | ICMP (1) | Don't care | PING Request |
| Multicast | IP (0x8000) | UDP (17) | mDNS | Bonjour |
| Unicast | IP (0x8000) | UDP (17) | SNMP (161) | MIB Acquisition Request |
| Broadcast | IP (0x8000) | UDP (17) | NBT (137) | Search Request For Terminals etc. |
| Unicast | IP (0x8000) | UDP (17) | DHCP (68) | Renewal Request For Leasing Term |
| Unicast | IP (0x8000) | TCP (6) | HTTP (80) | Request For WEB Page |
| Unicast | IP (0x8000) | TCP (6) | HTTPS (443) | Request For WEB Page |
| Unicast | IP (0x8000) | TCP (6) | FTP (21) | File Transfer Request |

Fig. 6B

| Filter Setting FIL | | | | Action |
|---|---|---|---|---|
| Dst_MAC | Type | Prot | Dst_Port | |
| Unicast | IP (0x8000) | ICMP (1) | Don't care | PING Request |
| Multicast | IP (0x8000) | UDP (17) | mDNS | Bonjour |
| Unicast | IP (0x8000) | UDP (17) | SNMP (161) | MIB Acquisition Request |
| Broadcast | IP (0x8000) | UDP (17) | NBT (137) | Search Request For Terminals etc. |
| Unicast | IP (0x8000) | UDP (17) | DHCP (68) | Renewal Request For Leasing Term |
| Unicast | IP (0x8000) | TCP (6) | Telnet (23) | Terminal Connection Request |
| Unicast | IP (0x8000) | TCP (6) | LPR (515) | Print Request in LPR |
| Unicast | IP (0x8000) | TCP (6) | RAW (910) | Print Request in Standard TCp/IP (RAW) |

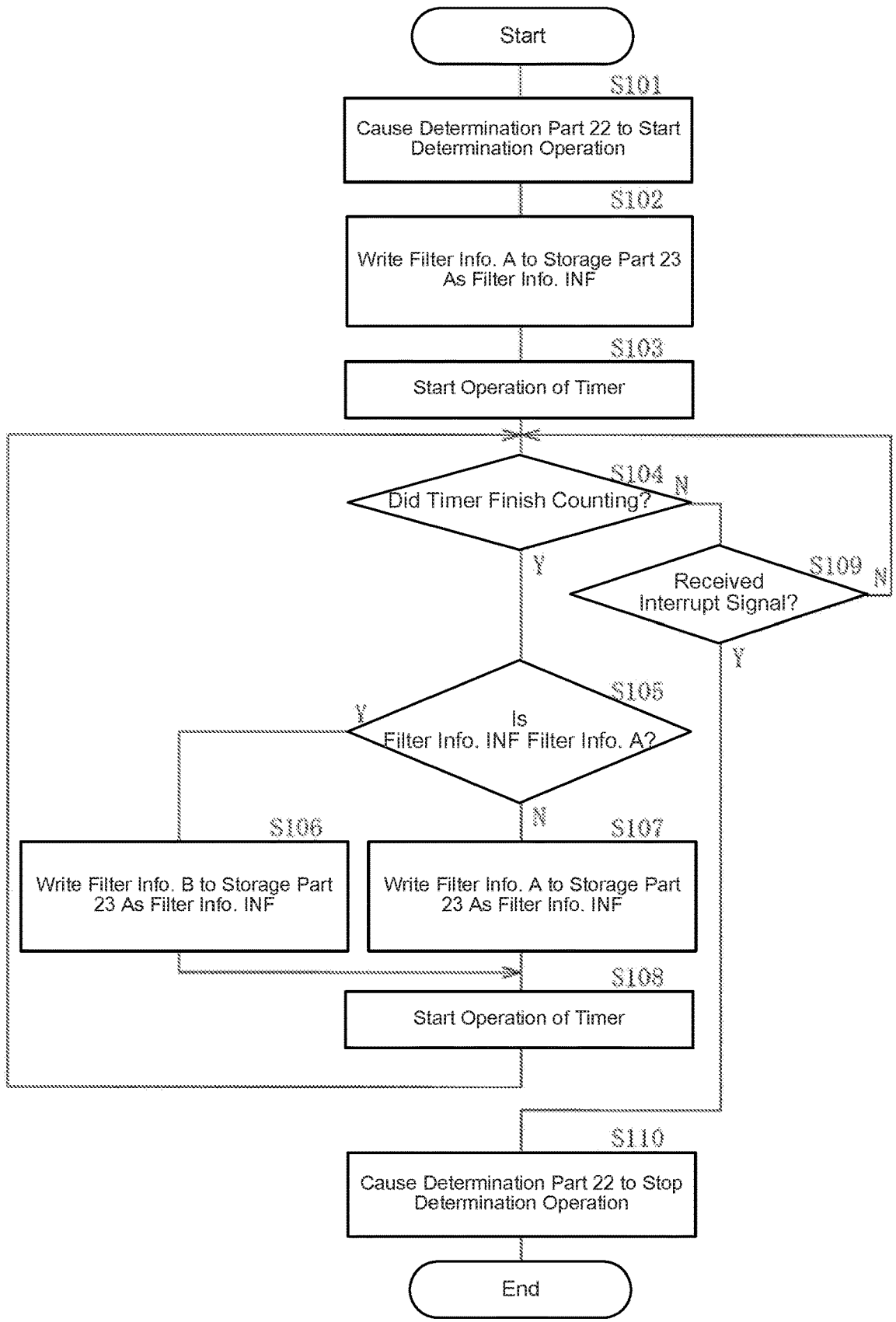

(A) Determination Control Part 32
(B) Determination Part 22
(C) Wireless LAN Router 9

(A) Determination Control Part 32
(B) Determination Part 22
(C) Wireless LAN Router 9

(A) Determination Control Part 32
(B) Determination Part 22
(C) Wireless LAN Router 9

Fig. 18

| Network Packet P | | | Filter Info. | | | | Filter Setting FIL | | | |
|---|---|---|---|---|---|---|---|---|---|---|
| Function | Action | Comment | A | B | C | D | Dst_MAC | Type | Prot | Dst_Port |
| ICMP | PING Request | No Re-Tms. | O | O | O | O | Unicast | IP (0x8000) | ICMP (1) | Don't care |
| Bonjour | Bonjour | No Re-Tms. | O | O | O | O | Multicast | IP (0x8000) | UDP (17) | mDNS |
| SNMP | MIB Acquisition Request | No Re-Tms. | O | O | O | O | Unicast | IP (0x8000) | UDP (17) | SNMP (161) |
| NBT | Search Request For Terminals etc. | No Re-Tms. | O | O | O | O | Broadcast | IP (0x8000) | UDP (17) | NBT (137) |
| DHCP | Renewal Request For Leasing Term | No Re-Tms. | O | O | O | O | Unicast | IP (0x8000) | UDP (17) | DHCP (68) |
| LPR | Print Request in LPR | | O | O | O | | Unicast | IP (0x8000) | TCP (6) | LPR (515) |
| HTTP | Request For WEB Page | | O | O | | O | Unicast | IP (0x8000) | TCP (6) | HTTP (80) |
| HTTPS | Request For WEB Page | | O | | | | Unicast | IP (0x8000) | TCP (6) | HTTPS (443) |
| RAW | Print Request in Standard TCp/IP (RAW) | | | O | | | Unicast | IP (0x8000) | TCP (6) | RAW (910) |
| FTP | File Transfer Request | | | | O | | Unicast | IP (0x8000) | TCP (6) | FTP (21) |
| Telnet | Terminal Connection Request | | | | O | | Unicast | IP (0x8000) | TCP (6) | Telnet (23) |
| WSD | Print Request in WSD | | | | | O | Unicast | IP (0x8000) | TCP (6) | WSD (5357) |
| IPP | Print Request in IPP | | | | | O | Unicast | IP (0x8000) | TCP (6) | IPP (631) |

*Fig. 19*

| Network Packet P || Reception No. | Priority | Filter Info. ||||
|---|---|---|---|---|---|---|---|
| Function | Action | | | A | B | C | D |
| ICMP | PING Request | — | PR1 | O | O | O | O |
| Bonjour | Bonjour | — | PR1 | O | O | O | O |
| SNMP | MIB Acquisition Request | — | PR1 | O | O | O | O |
| NBT | Search Request For Terminals etc. | — | PR1 | O | O | O | O |
| DHCP | Renewal Request For Leasing Term | — | PR1 | O | O | O | O |
| LPR | Print Request in LPR | 3 | PR2 | O | O | O | |
| HTTP | Request For WEB Page | 2 | PR2 | O | O | | O |
| HTTPS | Request For WEB Page | 1 | PR3 | O | | | |
| RAW | Print Request in Standard TCp/IP (RAW) | 1 | PR3 | | O | | |
| FTP | File Transfer Request | 0 | PR4 | | | O | |
| Telnet | Terminal Connection Request | 0 | PR4 | | | O | |
| WSD | Print Request in WSD | 0 | PR4 | | | | O |
| IPP | Print Request in IPP | 0 | PR4 | | | | O |

Fig. 20A

| Filter Setting FIL | | | | Action |
|---|---|---|---|---|
| Dst_MAC | Type | Prot | Dst_Port | |
| Unicast | IP (0x8000) | ICMP (1) | Don't care | PING Request |
| Multicast | IP (0x8000) | UDP (17) | mDNS | Bonjour |
| Unicast | IP (0x8000) | UDP (17) | SNMP (161) | MIB Acquisition Request |
| Broadcast | IP (0x8000) | UDP (17) | NBT (137) | Search Request For Terminals etc. |
| Unicast | IP (0x8000) | UDP (17) | DHCP (68) | Renewal Request For Leasing Term |
| Unicast | IP (0x8000) | TCP (6) | LPR (515) | Print Request in LPR |
| Unicast | IP (0x8000) | TCP (6) | HTTP (80) | Request For WEB Page |
| Unicast | IP (0x8000) | TCP (6) | HTTPS (443) | Request For WEB Page |

Fig. 20B

| Filter Setting FIL | | | | Action |
|---|---|---|---|---|
| Dst_MAC | Type | Prot | Dst_Port | |
| Unicast | IP (0x8000) | ICMP (1) | Don't care | PING Request |
| Multicast | IP (0x8000) | UDP (17) | mDNS | Bonjour |
| Unicast | IP (0x8000) | UDP (17) | SNMP (161) | MIB Acquisition Request |
| Broadcast | IP (0x8000) | UDP (17) | NBT (137) | Search Request For Terminals etc. |
| Unicast | IP (0x8000) | UDP (17) | DHCP (68) | Renewal Request For Leasing Term |
| Unicast | IP (0x8000) | TCP (6) | LPR (515) | Print Request in LPR |
| Unicast | IP (0x8000) | TCP (6) | HTTP (80) | Request For WEB Page |
| Unicast | IP (0x8000) | TCP (6) | RAW (910) | Print Request in Standard TCp/IP (RAW) |

Fig. 20C

| Filter Setting FIL | | | | Action |
|---|---|---|---|---|
| Dst_MAC | Type | Prot | Dst_Port | |
| Unicast | IP (0x8000) | ICMP (1) | Don't care | PING Request |
| Multicast | IP (0x8000) | UDP (17) | mDNS | Bonjour |
| Unicast | IP (0x8000) | UDP (17) | SNMP (161) | MIB Acquisition Request |
| Broadcast | IP (0x8000) | UDP (17) | NBT (137) | Search Request For Terminals etc. |
| Unicast | IP (0x8000) | UDP (17) | DHCP (68) | Renewal Request For Leasing Term |
| Unicast | IP (0x8000) | TCP (6) | LPR (515) | Print Request in LPR |
| Unicast | IP (0x8000) | TCP (6) | FTP (21) | File Transfer Request |
| Unicast | IP (0x8000) | TCP (6) | Telnet (23) | Terminal Connection Request |

Fig. 20D

| Filter Setting FIL | | | | Action |
|---|---|---|---|---|
| Dst_MAC | Type | Prot | Dst_Port | |
| Unicast | IP (0x8000) | ICMP (1) | Don't care | PING Request |
| Multicast | IP (0x8000) | UDP (17) | mDNS | Bonjour |
| Unicast | IP (0x8000) | UDP (17) | SNMP (161) | MIB Acquisition Request |
| Broadcast | IP (0x8000) | UDP (17) | NBT (137) | Search Request For Terminals etc. |
| Unicast | IP (0x8000) | UDP (17) | DHCP (68) | Renewal Request For Leasing Term |
| Unicast | IP (0x8000) | TCP (6) | HTTP (80) | Request For WEB Page |
| Unicast | IP (0x8000) | TCP (6) | WSD (5357) | Print Request in WSD |
| Unicast | IP (0x8000) | TCP (6) | IPP (631) | Print Request in IPP |

*Fig. 21*

| Function | Priority | Corresponding Filter Inf. | Writing Order OD ||||||||||
|---|---|---|---|---|---|---|---|---|---|---|---|---|
| | | | 1 | 2 | 3 | 4 | 5 | 6 | 7 | 8 | 9 | 10 |
| | | | A | B | A | B | C | A | B | A | B | D |
| ICMP | PR1 | A, B, C, D | ○ | ○ | ○ | ○ | ○ | ○ | ○ | ○ | ○ | ○ |
| Bonjour | PR1 | A, B, C, D | ○ | ○ | ○ | ○ | ○ | ○ | ○ | ○ | ○ | ○ |
| SNMP | PR1 | A, B, C, D | ○ | ○ | ○ | ○ | ○ | ○ | ○ | ○ | ○ | ○ |
| NBT | PR1 | A, B, C, D | ○ | ○ | ○ | ○ | ○ | ○ | ○ | ○ | ○ | ○ |
| DHCP | PR1 | A, B, C, D | ○ | ○ | ○ | ○ | ○ | ○ | ○ | ○ | ○ | ○ |
| LPR | PR2 | A, B, C | ○ | ○ | ○ | ○ | ○ | ○ | ○ | ○ | ○ | |
| HTTP | PR2 | A, B, D | ○ | ○ | ○ | | ○ | ○ | ○ | ○ | ○ | ○ |
| HTTPS | PR3 | A | ○ | | ○ | | | ○ | | ○ | | |
| RAW | PR3 | B | | ○ | | ○ | | | ○ | | ○ | |
| FTP | PR4 | C | | | | | ○ | | | | | |
| Telnet | PR4 | C | | | | | ○ | | | | | |
| WSD | PR4 | D | | | | | | | | | | ○ |
| IPP | PR4 | D | | | | | | | | | | ○ |

# IMAGE FORMING APPARATUS

TECHNICAL FIELD

The present invention relates to an image forming apparatus that forms an image on a continuous medium.

BACKGROUND

In an image forming apparatus, a power saving mode for reducing power consumption is often provided. For example, Patent Document 1 discloses an image forming apparatus that switches a mode from a power saving mode to a normal mode based on a protocol requested by a computer.

RELATED ART

[Patent Doc. 1] JP Laid-Open Patent Application Publication 2012-179788

In such a power saving mode, reduction in power consumption is desired, and further reduction in power consumption is expected.

It is desirable to provide an image forming apparatus that can reduce power consumption.

SUMMARY

An image forming apparatus disclosed in the application includes a power supply part that supplies electronic power in a power mode that is chosen from two different power modes that are a first mode and a second mode wherein a power consumption in the second mode is smaller than a power consumption in the first mode, a communication part that includes, a transmitting and receiving part that receives a network packet in both the first mode and the second mode; and a determination part that stores filter information containing a plurality of filter settings and determines whether or not the network packet, which is received by the transmitting and receiving part in the second mode, matches one of the plurality of filter settings, creating a determination result; a determination control part that performs a rewrite operation to repeatedly rewrite the filter information in the determination part while running in the second mode; a power supply control part that transits the power mode of the power supply part from the second mode to the first mode based on the determination result of the determination part; a packet transmitting and receiving part that receives the network packet supplied from the transmitting and receiving part in the first mode and stops an operation of itself in the second mode; and an image forming part that forms an image on a recording medium based on the network packet received by the packet transmitting and receiving part in the first mode and stops an operation of itself in the second mode.

According to the image forming apparatus in an embodiment of the present invention, in the second mode, the rewrite operation to repeatedly rewrite the filter information in the determination part is performed. Therefore, power consumption can be reduced.

BRIEF DESCRIPTION OF THE DRAWINGS

FIG. 4 is a table illustrating examples of network packets that are triggers for returning to a normal mode according to the first embodiment.

FIG. 5 is an explanatory diagram illustrating an example of a network packet.

FIG. 6A is a table illustrating an example of filter information according to the first embodiment.

FIG. 6B is a table illustrating an example of other filter information according to the first embodiment.

FIG. 7 is a flow diagram illustrating an operation example of the image forming apparatus illustrated in FIG. 2.

FIG. 18 is a table illustrating examples of network packets that are triggers for returning to a normal mode according to the second embodiment.

FIG. 19 is a table illustrating an operation example of the image forming apparatus illustrated in FIG. 17.

FIG. 20A is a table illustrating an example of filter information according to the second embodiment.

FIG. 20B is a table illustrating an example of other filter information according to the second embodiment.

FIG. 20C is a table illustrating an example of other filter information according to the second embodiment.

FIG. 20D is a table illustrating an example of other filter information according to the second embodiment.

FIG. 21 is another table illustrating an operation example of the image forming apparatus illustrated in FIG. 17.

DETAILED DESCRIPTIONS OF PREFERRED EMBODIMENTS

In the following, embodiments of the present invention are described with reference to the drawings. The description will be given in the following order:

1. First Embodiment
2. Second Embodiment

<1. First Embodiment> [Configuration Example]

Figure 1:
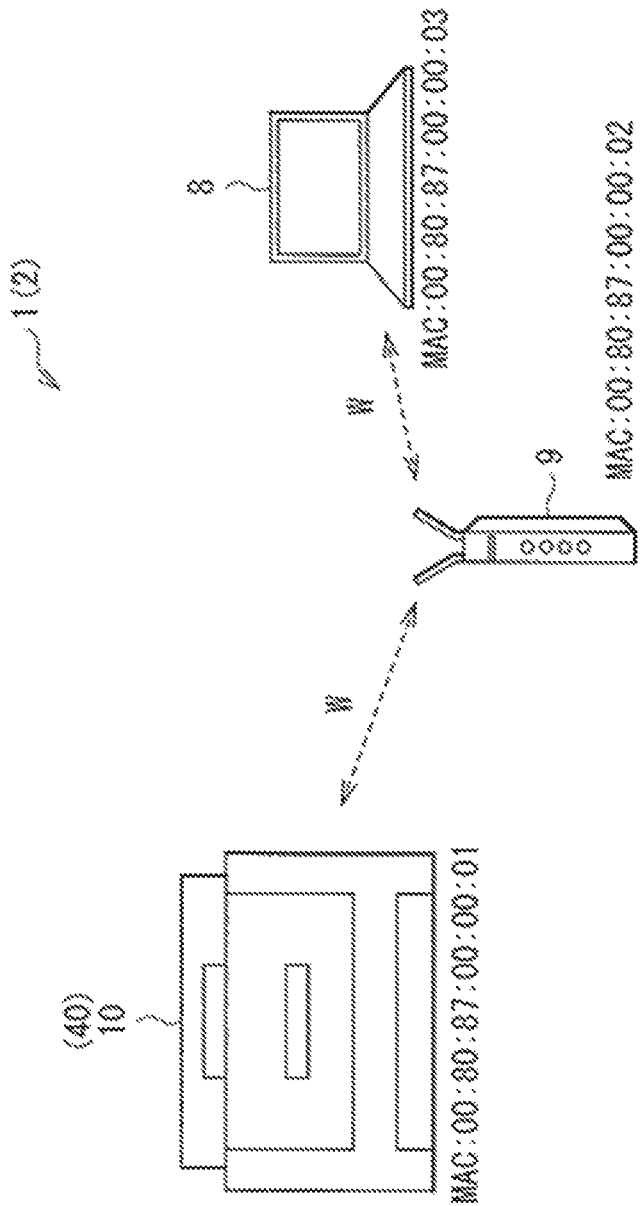
FIG. 1 is an explanatory diagram illustrating a configuration example of an image forming system according to an embodiment.

FIG. 1 illustrates a configuration example of an image forming system 1 having an image forming apparatus (image forming apparatus 10) according to an embodiment of the present invention. The image forming system 1 includes an information processing device 8, a wireless LAN (Local Area Network) router 9, and an image forming apparatus 10. In the image forming system 1, the information processing device 8 and the image forming apparatus 10 are configured to perform wireless communication W with the wireless LAN router 9 using a wireless LAN. In the wireless communication W, various kinds of information such as data and control information are transmitted and received using a plurality of network packets P.

The information processing device 8 is, for example, a personal computer. In the information processing device 8, for example, application software such as word processor software and a printer driver are installed. For example, the information processing device 8 generates print data DP using the printer driver based on a print instruction from a user, and transmits the generated print data DP to the image forming apparatus 10 via the wireless LAN router 9. In this example, the information processing device 8 has an MAC (Media Access Control) address of "00:80:87:00:00:03".

The wireless LAN router 9 is configured to perform wireless communication W with the information processing device 8 and the image forming apparatus 10 using the wireless LAN. In this example, the wireless LAN router 9 has an MAC address of "00:80:87:00:00:02".

The image forming apparatus 10 is configured to form an image on a recording medium, for example, based on print data DP transmitted from the information processing device 8 via the wireless LAN router 9. In this example, the image forming apparatus 10 has an MAC address of "00:80:87:00:00:01".

The image forming apparatus 10 has two power supply modes M (a normal mode M1 and a power saving mode M2). The normal mode M1 is a mode in which an image forming operation can be performed. The power saving mode M2 is a standby mode that allows power consumption to be reduced. When a state in which an image forming operation is not performed has continued for a predetermined time period in the normal mode M1, the image forming apparatus 10 causes the power supply mode M to transition from the normal mode M1 to the power saving mode M2. Further, in the power saving mode M2, the image forming apparatus 10 performs a determination operation based on a received network packet P. When the network packet P is a predetermined network packet P, the image forming apparatus 10 returns to the normal mode M1 by causing the power supply mode M to transition from the power saving mode M2 to the normal mode M1.

Figure 2:
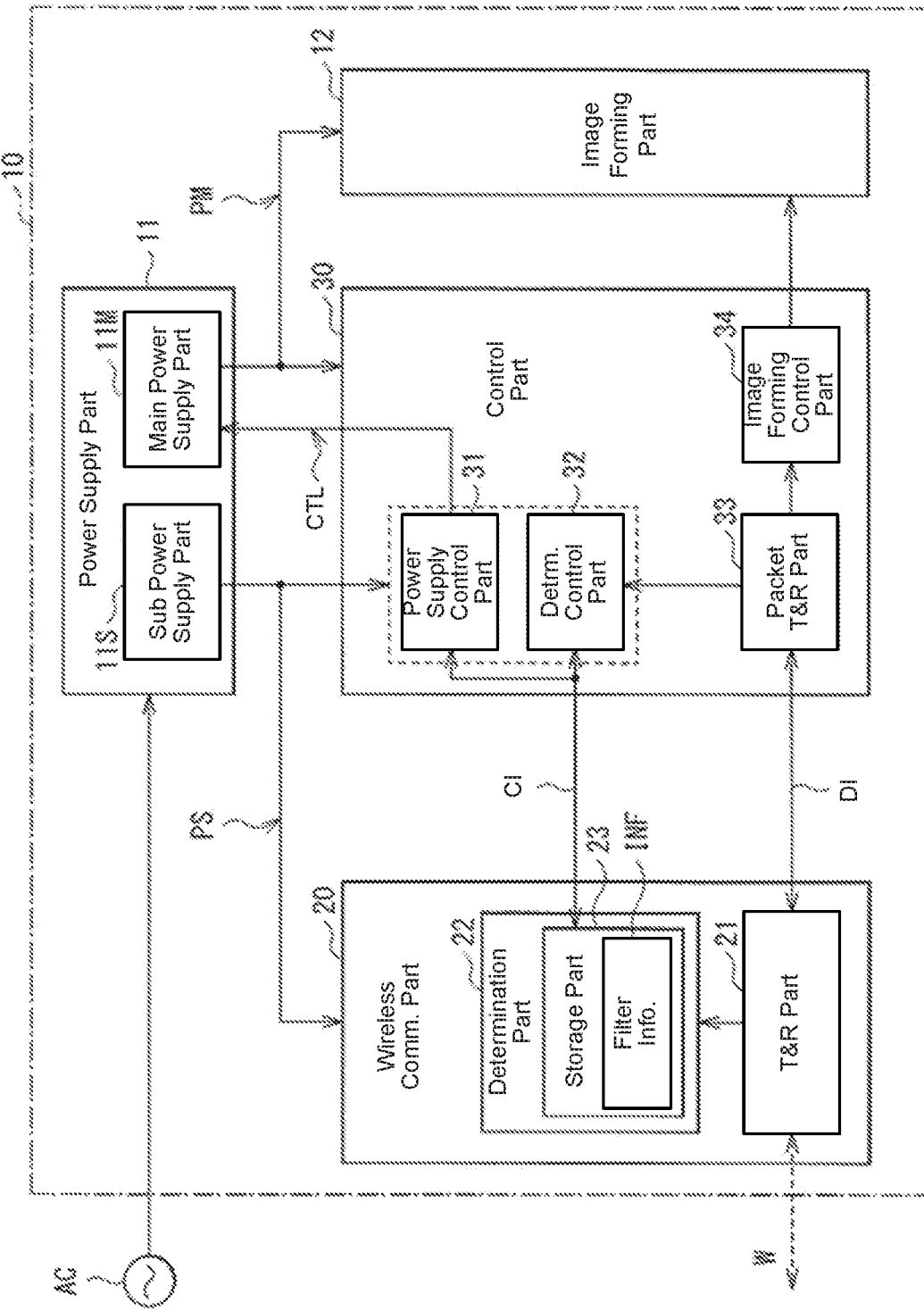
FIG. 2 is a block diagram illustrating a configuration example of an image forming apparatus according to a first embodiment.

FIG. 2 illustrates a configuration example of the image forming apparatus 10. The image forming apparatus 10 includes a power supply part 11, a wireless communication part 20, a control part 30, and an image forming part 12. The power supply part 11, the wireless communication part 20, and the control part 30 are configured using, for example, semiconductor circuits.

The power supply part 11 is configured to generate power-supply power used in blocks of the image forming apparatus 10 based on AC power supplied from an AC power supply AC such as a commercial power supply. The power supply part 11 has a main power supply part 11M and a sub power supply part 11S.

The main power supply part 11M is configured to generate power-supply power PM in the normal mode M1 and supply the generated power-supply power PM to the control part 30 and the image forming part 12. Further, the main power supply part 11M is configured to not generate the power-supply power PM in the power saving mode M2. The main power supply part 11M generates the power-supply power PM or stops generating the power-supply power PM based on a power supply control signal CTL supplied from the control part 30.

The sub power supply part 11S is configured to generate power-supply power PS in both the normal mode M1 and the power saving mode M2 and supplies the generated power-supply power PS to the wireless communication part 20 and some blocks (a power supply control part 31 and a determination control part 32, which is shown as "Detrn. Control Part" in the drawing, to be described later) in the control part 30. That is, the power-supply power PS is always supplied to the wireless communication part 20, the power supply control part 31, and the determination control part 32.

The wireless communication part 20, which is shown as "Wireless Comm. Part" in the drawing, is configured using, for example, a wireless LAN chip. The wireless communication part 20 is configured to operate based on the supplied power-supply power PS in both the normal mode M1 and the power saving mode M2. The wireless communication part 20 has a transmitting and receiving part 21, which is shown as "T&R Part" in the drawing, and a determination part 22.

The transmitting and receiving part 21 is configured to perform the wireless communication W using the wireless LAN. Specifically, the transmitting and receiving part 21 supplies a network packet P received via the wireless communication W to the determination part 22. Further, in the normal mode M1, the transmitting and receiving part 21 supplies a received network packet P to the control part 30 via a data interface DI. Further, in the normal mode M, the transmitting and receiving part 21 transmits via the wireless communication W a network packet P supplied from the control part 30 via the data interface DI.

The determination part 22 is configured to perform a determination operation in the power saving mode M2 based on a network packet P supplied from the transmitting and receiving part 21. The determination part 22 has a storage part 23. The storage part 23 stores filter information INF. The filter information INF contains a plurality of filter settings FIL. The filter information INF can contain up to 8 filter settings FIL in this embodiment. The filter information INF will be described in detail later.

In the power saving mode M2, the determination part 22 performs a determination operation based on an instruction supplied from the control part 30 via a control interface CI. In the determination operation, the determination part 22 determines whether or not a network packet P received by the transmitting and receiving part 21 corresponds to one of the plurality of filter settings FIL stored in the storage part 23. Then, in the power saving mode M2, when the network packet P corresponds to one of the plurality of filter settings FIL, the determination part 22 generates an interrupt signal SIG and supplies the generated interrupt signal SIG to the control part 30 via the control interface CI. As a result, in the image forming apparatus 10, based on the interrupt signal SIG, the power supply mode M is caused to transition from the power saving mode M2 to the normal mode M1.

The control part 30 is configured to control an overall operation of the image forming apparatus 10. The control part 30 is configured using, for example, a CPU (Central Processing Unit), a RAM (Random Access Memory), a ROM (Read Only Memory), and the like. The control part 30 includes a power supply control part 31, a determination control part 32, a packet transmitting and receiving part 33, and an image forming control part 34. The power supply control part 31 and the determination control part 32 are configured to operate based on the supplied power-supply power PS in both the normal mode M1 and the power saving mode M2. The packet transmitting and receiving part 33 and the image forming control part 34 are configured to operate based on the supplied power-supply power PM in the normal mode M1 and to stop an operation of itself in the power saving mode M2. In other words, Those parts 33 and 34 completely stop operating in the mode.

The power supply control part 31 is configured to control the power supply mode M in the image forming apparatus 10.

Figure 3:
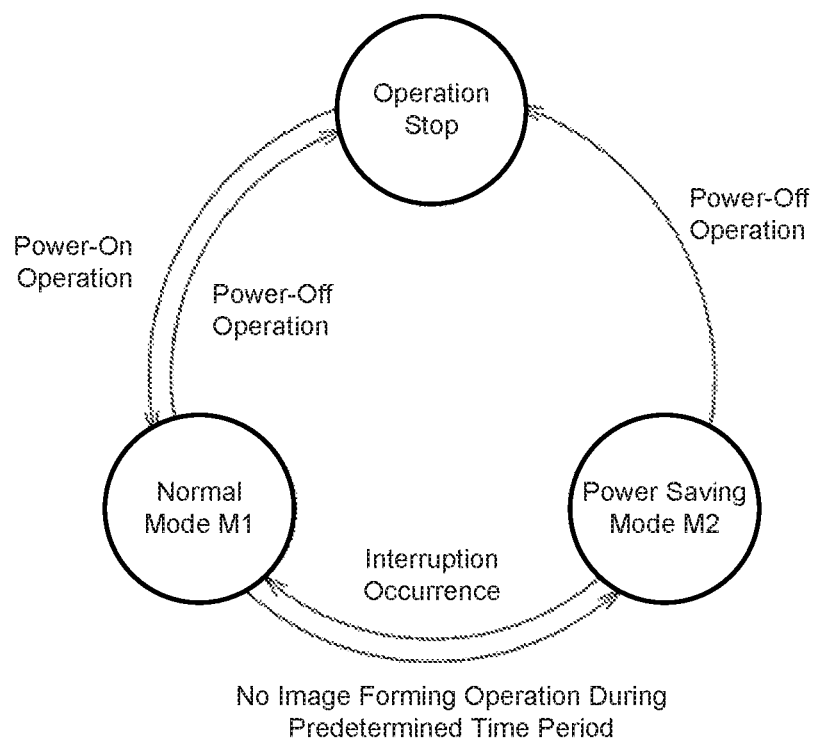
FIG. 3 is a state transition diagram illustrating an operation example of an image forming apparatus according to an embodiment.

FIG. 3 illustrates transitions of the power supply mode M in the image forming apparatus 10. When a user performs a power-on operation, the power supply control part 31 sets the power supply mode M to the normal mode M1. Then, when the power supply mode M is the normal mode M1 and a state in which an image forming operation is not performed has continued for a predetermined time period, the power supply control part 31 causes the power supply mode M to transition from the normal mode M1 to the power saving mode M2. Further, when the power supply mode M is the power saving mode M2 and an interrupt signal SIG is supplied from the determination part 22, the power supply control part 31 causes the power supply mode M to transition from the power saving mode M2 to the normal mode M1. Further, when the power supply mode M is the normal mode M1 or the power saving mode M2 and a user performs a power-off operation, the image forming apparatus 10 stops an operation of itself.

Further, the power supply control part 31 supplies a power supply control signal CTL to the main power supply part 11M and thereby causes the main power supply part 11M to generate the power-supply power PM in the normal mode M1, and causes the main power supply part 11M to stop generating the power-supply power PM in the power saving mode M2.

The determination control part 32 is configured to control an operation of the determination part 22 in the wireless communication part 20. Specifically, in the power saving mode M2, the determination control part 32 instructs, via the control interface CI, the determination part 22 to perform a determination operation. Then, in the power saving mode M2, every time a predetermined time period T has elapsed, the determination control part 32 supplies filter information INF to the determination part 22 via the control interface CI, and thereby, repeatedly rewrites the filter information INF stored in the storage part 23 of the determination part 22. That is, the predetermined time period T is a rewrite period of the filter information INF. Based on information about a retransmission interval T1 (to be described later) supplied from the packet transmitting and receiving part 33, the determination control part 32 sets the predetermined time period T to a time period about the same as the retransmission interval T1.

As described above, in this example, the number of the filter settings FIL that can be stored in the storage part 23 is restricted to 8. Therefore, in the image forming apparatus 10, in this way, by repeatedly rewriting the filter information INF, the restriction on the number of the filter settings FIL used in a determination operation can be relaxed.

The packet transmitting and receiving part 33 is configured to perform exchange of network packets P via the data interface DI with the transmitting and receiving part 21 of the wireless communication part 20 in the normal mode M1. Specifically, in normal mode M1, the packet transmitting and receiving part 33 receives a network packet P supplied from the transmitting and receiving part 21 via the data interface DI. Then, for example, the packet transmitting and receiving part 33 acquires print data DP based on the received network packet P, and supplies the acquired print data DP to the image forming control part 34. Further, the packet transmitting and receiving part 33 generates a network packet P to be transmitted and supplies the generated network packet P to the transmitting and receiving part 21 via the data interface DI.

Further, in the normal mode M1, for example, immediately after power on, or in a predetermined time period set intermittently, when a network packet P for which a protocol is TCP (Transmission Control Protocol) is received, the packet transmitting and receiving part 33 also has a function of causing the network packet P to be retransmitted by intentionally not responding to the network packet P and detecting a time interval (retransmission interval T1) between the first network packet P and the retransmitted second network packet P. Then, the packet transmitting and receiving part 33 supplies information about the retransmission interval T1 to the determination control part 32.

The image forming control part 34 is configured to perform predetermined image processing based on the print data DP supplied from the packet transmitting and receiving part 33 in the normal mode M1 and control the operation of the image forming part 12 based on the result of the image processing.

The image forming part 12 is configured to form an image on a recording medium based on an instruction from the image forming control part 34 in the normal mode M1. The image forming part 12 includes, for example, a mechanism for carrying a recording medium, a mechanism for forming a developer image on the recording medium, and a mechanism for fusing the developer image formed on the recording medium onto the recording medium. The image forming part 12 executes operations (including an image forming process), based on the supplied power-supply power PM in the normal mode M1, and stops these operations in the power saving mode M2. Putting another way, the image forming process is not performed in the power saving mode M2.

(About the Filter Information INF)

In the image forming apparatus 10, the determination part 22 determines whether or not a received network packet P corresponds to one of the plurality of filter settings FIL contained in the filter information INF. In the following, the filter information INF is described in detail.

FIG. 4 shows a list of network packets P for which, when being received by the image forming apparatus 10, the power supply mode M should transition from the power saving mode M2 to the normal mode M1. In this example, when the image forming apparatus 10 receives any one of 11 types (ICMP, Bonjour, SNMP, NBT, DHCP, HTTP, HTTPS, FTP, Telnet, LPR, RAW) of network packets P, it is desirable that the power supply mode M transition from the power saving mode M2 to the normal mode M1. That is, these 11 types of network packets P are packets that are triggers for returning to the normal mode M1. Here, ICMP is the Internet Control Message Protocol, SNMP is the Simple Network Management Protocol, NBT is the NetBIOS over TCP/IP, DHCP is the Dynamic Host Configuration Protocol, HTTP is the Hypertext Transfer Protocol, HTTPS is the Hypertext Transfer Protocol Secure, FTP is the File Transfer Protocol, the LPR is the Line Printer Daemon Protocol, IP is the Internet Protocol, UDP is the User Datagram Protocol, and mDNS is the Multicast DNS (Domain Name System).

The determination part 22 uses the filter settings FIL to determine whether or not a network packet P received by the transmitting and receiving part 21 is one of these 11 types of network packets P. As illustrated in FIG. 4, filter settings FIL include information about a destination MAC address (Dst MAC), a layer 2 protocol type (Type), a layer 3 protocol type (Prot), and a destination port number (Dst Port).

A description will be given using LPR as an example. In general, for example, even when operating in the power saving mode, the image forming apparatus desirably responds to a print request with respect to the image forming apparatus. Therefore, a network packet P that performs a print request using LPR is a packet that is a trigger for returning to the normal mode M1.

In FIG. 4, there is a column of "Comment" with respect to Network Packet P. When the retransmission is not executed, "No Re-Trans." is added in the column.

FIG. 5 illustrates an example of a network packet P that performs a print request using LPR and is received by the image forming apparatus 10. In FIG. 5, data is represented using hexadecimal numbers. This network packet P includes information about a destination MAC address (Dst MAC), a layer 2 protocol type (Type), a layer 3 protocol type (Prot), and a destination port number (Dst Port). The destination MAC address (Dst MAC) is set to "00:80:87:00:00:01" in this example. That is, this network packet P is a packet transmitted by setting the image forming apparatus 10 as a destination. In other words, transmission of this network packet P is of so-called unicast. The layer 2 protocol type (Type) is set to "8000" in this example. That is, the layer 2 protocol type is IP (0x8000). The layer 3 protocol type (Prot) is set to "06" in this example. That is, the layer 3 protocol type is TCP (6). The destination port number (Dst Port) is set to "0203" in this example. That is, destination port number is LPR (515).

By confirming that the destination MAC address (Dst MAC) included in a received network packet P is the MAC address of the image forming apparatus 10, the layer 2 protocol type (Type) is IP, the layer 3 protocol type (Prot) is TCP, and the destination port number (Dst Port) is 515, the determination part 22 can determine that the network packet P is a print request using LPR with respect to the image forming apparatus 10.

Next, a description will be given using ICMP as an example. In general, for example, even when operating in a power saving mode, a device connected to a network needs to respond to a PING request with respect to the device. Therefore, a network packet P that performs a PING request using ICMP is a packet that is a trigger for returning to the normal mode M1. By confirming that the destination MAC address (Dst MAC) included in a received network packet P is the MAC address of the image forming apparatus 10, the layer 2 protocol type (Type) is IP, and the layer 3 protocol type (Prot) is ICMP, the determination part 22 can determine that the network packet P is a PING request with respect to the image forming apparatus 10.

As shown in FIG. 4, there are 11 types of network packets P to be determined by the determination part 22. On the other hand, the number of the filter settings FIL that can be stored in the storage part 23 is restricted to 8. Therefore, in the image forming apparatus 10, two filter information sets, filter information A and filter information B, are prepared, and the determination control part 32 alternately and repeatedly writes these two filter information sets, the filter information A and the filter information B, as the filter information INF to the storage part 23 every time the predetermined time period T has elapsed.

Filter information A may be termed as a first filter information set, filter information B may be termed as a second filter information set. In the embodiment, the first and second information sets contain the same filter setting items but these filter settings are not the same.

FIG. 6A illustrates an example of the filter information A, and FIG. 6B illustrates an example of the filter information B. In FIG. 4, as indicated using "O", the filter information A includes 8 filter settings FIL for ICMP, Bonjour, SNMP, NBT, DHCP, HTTP, HTTPS, and FTP, and the filter information B includes 8 filter settings FIL for ICMP, Bonjour, SNMP, NBT, DHCP, Telnet, LPR, and RAW.

Five filter settings FIL for ICMP, Bonjour, SNMP, NBT, and DHCP are included in both the filter information A and the filter information B. That is, the layer 3 protocol type (Prot) of these network packets P is ICMP or UDP, and is a protocol that does not perform retransmission. Therefore, when the image forming apparatus 10 fails to receive a network packet P of these types, the image forming apparatus 10 cannot receive the same network packet P again. Therefore, in the image forming apparatus 10, both the filter information A and the filter information B include these five filter settings FIL.

On the other hand, three filter settings FIL for HTTP, HTTPS and FTP are included only in the filter information A. That is, the layer 3 protocol type (Prot) of these network packets P is TCP, and is a protocol that performs retransmission. Therefore, even when the image forming apparatus 10 fails to receive a network packet P of these types, the image forming apparatus 10 can receive a retransmitted network packet P. Therefore, in the image forming apparatus 10, only the filter information A includes these three filter settings FIL.

Similarly, three filter settings FIL for Telnet, LPR and RAW are included only in the filter information B. That is, since these are protocols that perform retransmission, even when the image forming apparatus 10 fails to receive a network packet P of these types, the image forming apparatus 10 can receive a retransmitted network packet P. Therefore, in the image forming apparatus 10, only the filter information B includes these three filter settings FIL.

The filter information A and the filter information B are included, for example, in a firmware of the image forming apparatus 10. That is, in this example, the filter information A and the filter information B are predetermined and fixed information. The determination control part 32 alternately and repeatedly writes these two filter information sets, the filter information A and the filter information B, as the filter information INF to the storage part 23 every time the predetermined time period T has elapsed. As a result, the determination part 22 can perform a determination operation based on 11 filter settings FIL included in the two filter information sets (the filter information A and the filter information B).

Here, the wireless communication part 20 corresponds to a specific example of "a communication part" in the present invention. The transmitting and receiving part 21 corresponds to a specific example of "a transmitting and receiving part" in the present invention. The determination part 22 corresponds to a specific example of "a determination part" in the present invention. The determination control part 32 corresponds to a specific example of "a determination control part" in the present invention. The power supply control part 31 corresponds to a specific example of "a power supply control part" in the present invention. The packet transmitting and receiving part 33 corresponds to a specific example of "a packet transmitting and receiving part" in the present invention. The image forming part 12 corresponds to a specific example of "an image forming part" in the present invention. The normal mode M1 corresponds to a specific example of "a first mode" in the present invention. The power saving mode M2 corresponds to a specific example of "a second mode" in the present invention. The filter information INF corresponds to a specific example of "filter information" in the present invention. The filter settings FIL correspond to a specific example of "filter settings" in the present invention. The filter information A and the filter information B correspond to a specific example of "a plurality of filter information sets" in the present invention. The filter information A, B may be respectively referred as first filter information and second filter information. The predetermined time period T corresponds to a specific example of "a predetermined time period" in the present invention. The retransmission interval T1 corresponds to a specific example of "a time interval" in the present invention.

[Operation and Effect]

Next, operation and effect of the image forming apparatus 10 of the present embodiment are described.

(Overview of Overall Operation)

First, with reference to FIG. 2, an overview of an overall operation of the image forming apparatus 10 is described. The main power supply part 11M of the power supply part 11 generates the power-supply power PM in the normal mode M1, and supplies the generated power-supply power PM to the control part 30 and the image forming part 12. The sub power supply part 11S generates the power-supply power PS in both the normal mode M1 and the power saving mode M2 and supplies the generated power-supply power PS to the wireless communication part 20 and some blocks (the power supply control part 31 and the determination control part 32) in the control part 30.

The transmitting and receiving part 21 of the wireless communication part 20 performs the wireless communication W using the wireless LAN. In the power saving mode M2, the determination part 22 performs a determination operation based on an instruction supplied from the control part 30. Then, when a network packet P received by the transmitting and receiving part 21 corresponds to one of the plurality of filter settings FIL, the determination part 22 generates an interrupt signal SIG and supplies the generated interrupt signal SIG to the control part 30.

The power supply control part 31 of the control part 30 controls the power supply mode M in the image forming apparatus 10. The packet transmitting and receiving part 33 performs exchange of network packets P with the transmitting and receiving part 21 of the wireless communication part 20 in the normal mode M1. Further, in the normal mode M1, for example, immediately after power on, or in a predetermined time period set intermittently, when a network packet P for which a protocol is TCP is received, the packet transmitting and receiving part 33 causes the network packet P to be retransmitted by intentionally not responding to the network packet P and detects the retransmission interval T1 between the first network packet P and the retransmitted second network packet P. In the power saving mode M2, the determination control part 32 instructs the determination part 22 to perform a determination operation. Then, in the power saving mode M2, every time the predetermined time period T which is set based on the retransmission interval T1 has elapsed, the determination control part 32 supplies the filter information INF to the determination part 22 via the control interface CI, and thereby, repeatedly rewrites the filter information INF stored in the storage part 23 of the determination part 22. The image forming control part 34 performs predetermined image processing based on the print data DP supplied from the packet transmitting and receiving part 33 in the normal mode M1 and controls the operation of the image forming part 12 based on the result of the image processing.

The image forming part 12 forms an image on a recording medium based on an instruction from the image forming control part 34 in the normal mode M1.

(Detailed Operation) Next, the operation in the power saving mode M2 is described in detail.

FIG. 7 illustrates an operation example of the determination control part 32 in the power saving mode M2. The determination control part 32 alternately and repeatedly writes the two filter information sets (the filter information A and the filter information B) as the filter information INF to the storage part 23 every time the predetermined time period T has elapsed. Then, when the power supply control part 31 receives an interrupt signal SIG from the determination part 22, the determination control part 32 causes the determination part 22 to stop the determination operation. In the following, this operation is described in detail.

First, when the power supply mode M transitions from the normal mode M1 to the power saving mode M2, the determination control part 32 causes the determination part 22 to starts a determination operation (Step S101). Specifically, the determination control part 32 instructs, via the control interface CI, the determination part 22 to start the determination operation. The determination part 22 starts the determination operation based on this instruction.

Next, the determination control part 32 writes the filter information A of the two filter information sets (the filter information A and the filter information B) to the storage part 23 of the determination part 22 as the filter information INF (Step S102). Specifically, the determination control part 32 supplies the filter information A as the filter information INF to the determination part 22 via the control interface CI, and thereby, writes the filter information INF to the storage part 23.

Next, the determination control part 32 starts an operation of a timer (Step S103).

Next, the determination control part 32 confirms whether or not the timer has finished counting a predetermined count corresponding to the predetermined time period T (Step S104).

In Step S104, when the timer has finished counting ("Y" in Step S104), the determination control part 32 confirms whether or not the filter information INF currently used by the determination part 22 is the filter information A (Step S105). When the current filter information INF is the filter information A ("Y" in Step S105), the filter information INF stored in the storage part 23 is the filter information A. Therefore, the determination control part 32 writes the filter information B as the filter information INF to the storage part 23 of the determination part 22 (Step S106). Putting it another way, the filter information INF is replaced with the filter information B. Specifically, the determination control part 32 supplies the filter information B as the filter information INF to the determination part 22 via the control interface CI, and thereby, writes (or rewrites) the filter information INF to the storage part 23. Further, when the current filter information INF is not the filter information A ("N" in Step S105), the filter information INF stored in the storage part 23 is the filter information B. Therefore, the determination control part 32 writes the filter information A as the filter information INF to the storage part 23 of the determination part 22 (Step S107). Specifically, the determination control part 32 supplies the filter information A as the filter information INF to the determination part 22 via the control interface CI, and thereby, writes the filter information INF to the storage part 23. Next, the determination control part 32 starts an operation of the timer (Step S108). Then, the process returns to Step S104.

Further, in Step S104, when the timer has not finished counting ("N" in Step S104), the determination control part 32 confirms whether or not the power supply control part 31 has received an interrupt signal SIG from the determination part 22 (Step S109). When the power supply control part 31 has not received an interrupt signal SIG ("N" in Step S109), the process returns to Step S104. At Step S104, receiving the interrupt signal SIG means that an interruption has occurred. When no interrupt signal has been delivered, it means that no interruption occurs.

In Step S109, when the power supply control part 31 has received an interrupt signal SIG ("Y" in Step S109), the determination control part 32 causes the determination part 22 to stop the determination operation (Step S110). Specifically, the determination control part 32 instructs, via the control interface CI, the determination part 22 to stop the determination operation. The determination part 22 stops the determination operation based on the instruction.

As a result, this flow is terminated.

Figure 8:
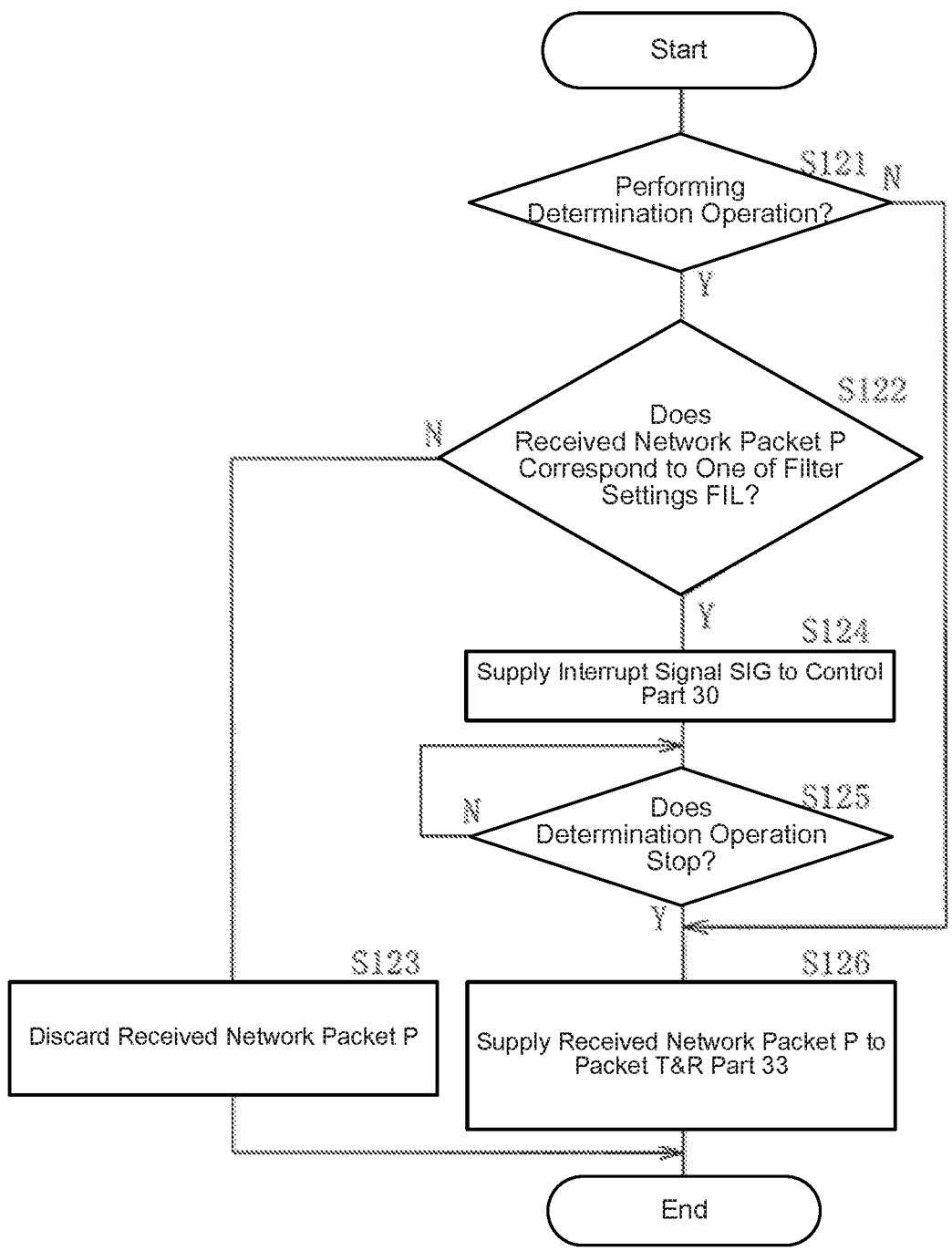
FIG. 8 is another flow diagram illustrating an operation example of the image forming apparatus illustrated in FIG. 2.

FIG. 8 illustrates an operation example of the wireless communication part 20 when the transmitting and receiving part 21 has received a network packet P. When the power supply mode M is the power saving mode M2, the transmitting and receiving part 21 performs a determination operation, and generates an interrupt signal SIG when the received network packet P corresponds to one of the plurality of filter settings FIL. In the following, this operation is described in detail.

First, the determination part 22 confirms whether or not a determination operation is being performed (Step S121). In other words, the determination part 22 confirms whether or not the power supply mode M is the power saving mode M2. When a determination operation is not performed ("N" in Step S121), the process proceeds to Step S126.

In Step S121, when a determination operation is performed ("Y" in Step S121), the determination part 22 confirms whether or not the network packet P received by the transmitting and receiving part 21 corresponds to one of the plurality of filter settings FIL stored in the storage part 23 (Step S122).

In Step S122, when the network packet P does not correspond to any one of the plurality of filter settings FIL ("N" in Step S122), the transmitting and receiving part 21 discards the received network packet P (Step S123). Then, the flow terminates.

In Step S122, when the network packet P corresponds to one of the plurality of filter settings FIL ("Y" in step S122), the determination part 22 generates an interrupt signal SIG and supplies the generated interrupt signal SIG to the control part 30 via the control interface CI (Step S124). It means that the interruption occurs.

Next, the determination part 22 confirms whether or not the determination operation has stopped (Step S125). When the determination operation has not stopped ("N" in Step S125), the determination part 22 repeats Step S125 until the determination operation stops. That is, when the determination part 22 supplies the interrupt signal SIG to the control part 30 in Step S124, the power supply control part 31 of the control part 30 causes the power supply mode M to transition from the power saving mode M2 to the normal mode M1, and the determination control part 32 of the control part 30 instructs the determination part 22 to stop the determination operation. The determination part 22 stops the determination operation based on the instruction. As a result, the determination part 22 confirms that the determination operation has stopped ("Y" in Step S125).

Then, the transmitting and receiving part 21 supplies the received network packet P to the packet transmitting and receiving part 33 of the control part 30 via the data interface DI (Step S126). That is, since the image forming apparatus 10 is operating in the normal mode M1, the packet transmitting and receiving part 33 can be supplied with the power-supply power PM and can operate. Therefore, the transmitting and receiving part 21 supplies the received network packet P to the packet transmitting and receiving part 33. The packet transmitting and receiving part 33 performs processing based on the network packet P.

As a result, this flow is terminated.

Next, the operation of the image forming apparatus 10 is described in detail using a specific example.

Figure 9:
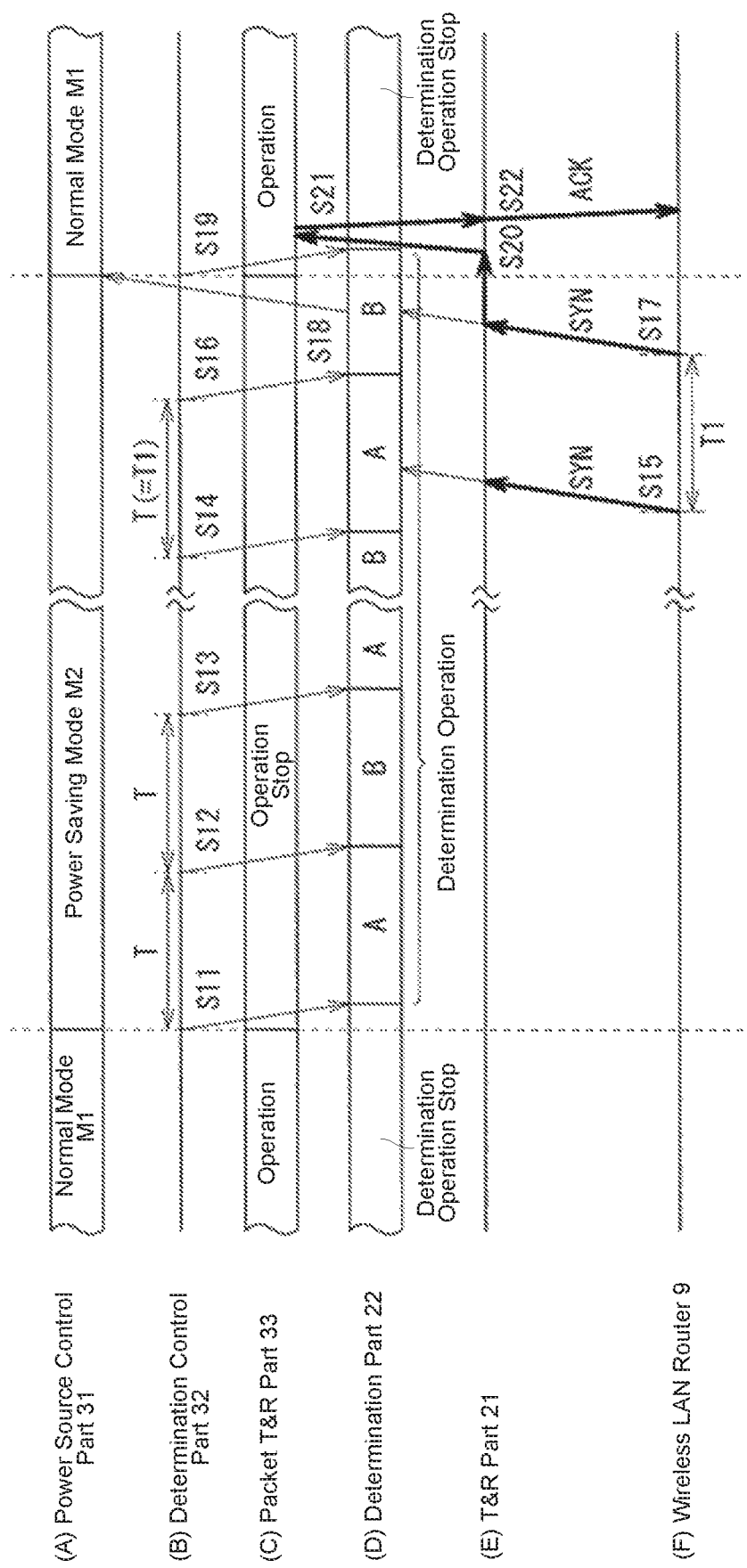
FIG. 9 is a timing diagram illustrating an operation example of the image forming apparatus illustrated in FIG. 2.

FIG. 9 illustrates an example of an operation of returning to the normal mode M1 in the image forming apparatus 10: (A) illustrates an operation of the power supply control part 31; (B) illustrates an operation of the determination control part 32; (C) illustrates an operation of the packet transmitting and receiving part 33; (D) illustrates an operation of the determination part 22; (E) illustrates an operation of the transmitting and receiving part 21; and (F) illustrates an operation of the wireless LAN router 9. In this example, during a time period in which the image forming apparatus 10 is operating in the power saving mode M2, the information processing device 8 transmits a network packet P that performs a print request using LPR to the image forming apparatus 10 via the wireless LAN router 9. The image forming apparatus 10 returns to the normal mode M1 based on this network packet P. In the following, this operation is described in detail.

When the power supply control part 31 causes the power supply mode M to transition from the normal mode M1 to the power saving mode M2, the determination control part 32 causes the determination part 22 to start a determination operation and writes the filter information A as the filter information INF to the storage part 23 of the determination part 22 (Step S11).

Then, when the predetermined time period T has elapsed, the determination control part 32 writes the filter information B as the filter information INF to the storage part 23 of the determination part 22 (Step S12). Similarly, when the predetermined time period T has elapsed, the determination control part 32 writes the filter information A as the filter information INF to the storage part 23 of the determination part 22 (Step S13). In this way, the determination control part 32 alternately and repeatedly writes the filter information A and the filter information B as the filter information INF to the storage part 23.

Then, at a certain timing thereafter, the determination control part 32 writes the filter information A as the filter information INF to the storage part 23 of the determination part 22 (Step S14).

Next, the wireless LAN router 9 transmits a network packet P (SYN in FIG. 9), which is transmitted from the information processing device 8 and performs a print request using LPR, to the image forming apparatus 10 (Step S15). This network packet P is, for example, the packet shown in FIG. 5. The transmitting and receiving part 21 receives this network packet P, and the determination part 22 determines whether or not this network packet P corresponds to one of the plurality of filter settings FIL included in the filter information INF (in this example, the filter information A). As illustrated in FIG. 6A, the filter information A does not contain a filter setting FIL related to the print request using LPR. Therefore, since the received network packet P does not correspond to any one of the plurality of filter settings FIL contained in the filter information A, the transmitting and receiving part 21 discards this network packet P.

Next, when the predetermined time period T has elapsed since the timing related to Step S14, the determination control part 32 writes the filter information B as the filter information INF to the storage part 23 of the determination part 22 (Step S16).

Next, the wireless LAN router 9 retransmits the network packet P (SYN) that performs a print request using LPR at a timing separated by the transmission interval T1 from the timing related to Step S15 (Step S17). The transmitting and receiving part 21 receives this network packet P, and the determination part 22 determines whether or not this network packet P corresponds to one of the plurality of filter settings FIL included in the filter information INF (in this example, the filter information B). As illustrated in FIG. 6B, the filter information B contains a filter setting FIL related to the print request using LPR. Therefore, transmitting and receiving part 21 keeps this network packet P without discarding the network packet P. Then, the determination part 22 generates an interrupt signal SIG and supplies this interrupt signal SIG to the power supply control part 31 (Step S18). Based on this interrupt signal SIG, the power supply control part 31 causes the power supply mode M to transition from the power saving mode M2 to the normal mode M1. As a result, the main power supply part 11M starts generating the power-supply power PM, and, for example, the packet transmitting and receiving part 33, the image forming control part 34, and the image forming part 12 start to operate based on the power-supply power PM.

Then, the determination control part 32 causes the determination part 22 to stop the determination operation (Step S19). Then, the transmitting and receiving part 21 supplies the kept network packet P (SYN) to the packet transmitting and receiving part 33 (Step S20).

The packet transmitting and receiving part 33 analyzes this network packet P (SYN) and thereby determines that the network packet P is a print request using LPR. Then, the packet transmitting and receiving part 33 generates a network packet P (ACK in FIG. 9) that responds to the network packet P, and supplies this network packet P to the transmitting and receiving part 21 (Step S21). Then, the transmitting and receiving part 21 transmits this network packet P to the wireless LAN router 9 (Step S22).

After that, the wireless LAN router 9 transmits this network packet P (ACK) to the information processing device 8. Based on this network packet P, the information processing device 8 transmits print data DP to the image forming apparatus 10 via the wireless LAN router 9 using, for example, a plurality of network packets P. Based on the print data DP, the image forming apparatus 10 forms an image on a recording medium.

Figure 10:
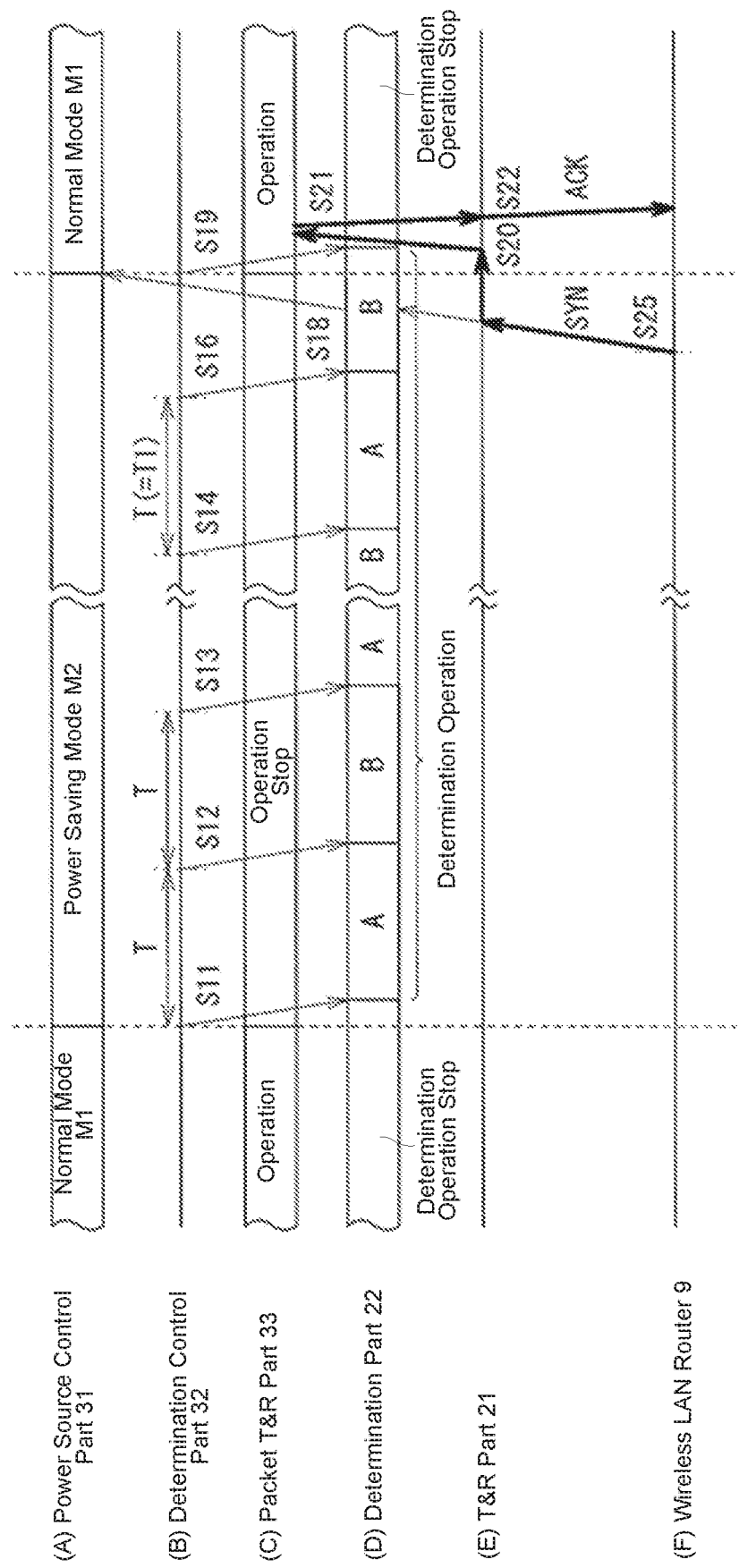
FIG. 10 is a timing diagram illustrating another operation example of the image forming apparatus illustrated in FIG. 2.

FIG. 10 illustrates another example of an operation of returning to the normal mode M1 in the image forming apparatus 10. In this example, the determination control part 32 writes the filter information B as the filter information INF to the storage part 23 of the determination part 22 (Step S16). Then, after that, the wireless LAN router 9 transmits a network packet P (SYN), which is transmitted from the information processing device 8 and performs a print request using LPR, to the image forming apparatus 10 (Step S25).

The transmitting and receiving part 21 receives this network packet P, and the determination part 22 determines whether or not this network packet P corresponds to one of the plurality of filter settings FIL included in the filter information INF (in this example, the filter information B). As illustrated in FIG. 6B, the filter information B contains a filter setting FIL related to the print request using LPR. Therefore, transmitting and receiving part 21 keeps this network packet P without discarding the network packet P. Then, the determination part 22 generates an interrupt signal SIG and supplies this interrupt signal SIG to the power supply control part 31 (Step S18). Based on this interrupt signal SIG, the power supply control part 31 causes the power supply mode M to transition from the power saving mode M2 to the normal mode M1. As a result, the main power supply part 11M starts generating the power-supply power PM, and, for example, the packet transmitting and receiving part 33, the image forming control part 34, and the image forming part 12 start to operate based on the power-supply power PM. The subsequent operation is the same as in the case of FIG. 9.

In FIGS. 9 and 10, the image forming apparatus 10 is described using an example in which a network packet P that performs a print request using LPR is received. However, the same applies also to other types of network packets P.

For example, the filter settings FIL for HTTP, HTTPS, and FTP are contained only in the filter information A, and the filter settings FIL for Telnet, LPR, and RAW are contained only in the filter information B. Therefore, when these types of network packets P are received, as illustrated in FIGS. 9 and 10, the image forming apparatus 10 can return to the normal mode M1 based on one or two network packets P.

Further, the filter settings FIL for ICMP, Bonjour, SNMP, NBT, and DHCP are contained in both the filter information A and the filter information B. Therefore, when these types of network packets P are received, the image forming apparatus 10 can return to the normal mode M1 based on one network packet P.

In this way, in the image forming apparatus 10, in the power saving mode M2, the determination control part 32 repeatedly rewrites the filter information INF stored in the storage part 23 every time the predetermined time period T has elapsed. Therefore, the wireless communication part 20 can determine the returning to the normal mode M1. As a result, in the power saving mode M2, power supply to the packet transmitting and receiving part 33 can be stopped. Therefore, power consumption can be reduced. That is, for example, a method is also possible in which the packet transmitting and receiving part 33 operates in the power saving mode M2 and performs analysis of a received network packet P and determines the returning to the normal mode M1 based on a result of the analysis. However, in this case, the packet transmitting and receiving part 33 consumes power in the power saving mode M2. On the other hand, in the present embodiment, the wireless communication part 20 can determine the returning to normal mode M1. Therefore, in power saving mode M2, the power supply to the packet transmitting and receiving part 33 can be stopped, and thus, power consumption can be reduced.

In this invention, power saving mode M2 (or second mode) consumes power less than normal mode M1 (or first mode). In one embodiment, the power consumption of power saving mode M2 is around 10% of that of normal mode M1. It may be 10% or less than that of normal saving mode M1 (or 0% to 10%). It may be ranged between 5% to 10% of the normal mode in another embodiment of the invention Further, in the image forming apparatus 10, the determination control part 32 repeatedly rewrites the filter information INF stored in the storage part 23 every time the predetermined time period T has elapsed. Specifically, in this example, the determination control part 32 alternately and repeatedly writes the filter information A and the filter information B as the filter information INF to the storage part 23 every time the predetermined time period T has elapsed. As a result, in the image forming apparatus 10, the restriction on the number of the filter settings FIL used in a determination operation can be relaxed. Specifically, in this example, the number of the filter settings FIL that can be stored in the storage part 23 is restricted to 8, whereas the number of the filter settings FIL used in determination operations can be 11. As a result, in the image forming apparatus 10, returning to the normal mode M1 can be performed based on more types of network packets P.

Further, in the image forming apparatus 10, since the predetermined time period T, which is the rewrite period of the filter information INF, is set to be about the same as the retransmission interval T1 of reception times of network packets P when a network packet P is retransmitted, the image forming apparatus 10 can return to the normal mode M1 based on, for example, one or two network packets P. Therefore, in the image forming apparatus 10, the retransmission number (or the number of retransmissions) of a network packet P can be reduced, and the image forming apparatus 10 can return to the normal mode M1 in a short time after the initial reception of the network packet P.

Further, in image forming apparatus 10, the retransmission interval T1 is detected, and the predetermined time period T, which is the rewrite period of the filter information INF, is set based on a result of the detection. As a result, in the image forming apparatus 10, for example, even when a state of the network changes, the predetermined time period T can be set according to the change. Therefore, the image forming apparatus 10 can return to the normal mode M1 more reliably based on one or two network packets P.

[Effects]

As described above, in the present embodiment, in the power saving mode, the filter information stored in the storage part is repeatedly rewritten every time the predetermined time period T has elapsed. Therefore, the wireless communication part can determine the returning to the normal mode, and thus, power consumption can be reduced.

In the present embodiment, the filter information stored in the storage part is repeatedly rewritten every time the predetermined time period T has elapsed. Therefore, the restriction on the number of the filter settings used in a determination operation can be relaxed, and, as a result, the returning to the normal mode can be performed based on more types of network packets.

[Modified Embodiment 1-1]

In the above embodiment, the two filter information sets (the filter information A and the filter information B) are alternately and repeatedly written to the storage part 23 on the order of " . . . ABAB . . . " every time the predetermined time period T has elapsed. However, the present invention is not limited to this. Instead of this, for example, it is also possible that 3 or more filter information sets are repeatedly written to the storage part 23 every time the predetermined time period T has elapsed. Specifically, for example, three filter information sets, filter information A, filter information B and filter information C, may be repeatedly written to the storage part 23, for example, in a cyclic order of " . . . ABCABC . . . ". In this case, the restriction on the number of the filter settings used in a determination operation can be further relaxed, and the returning to the normal mode M1 can be performed based on 1-3 network packets P. Further, for example, four filter information sets, filter information A, filter information B, filter information C and filter information D, may be repeatedly written to the storage part 23, for example, in a cyclic order of " . . . ABCDABCD . . . ". In this case, the restriction on the number of the filter settings used in a determination operation can be further relaxed, and the returning to the normal mode M1 can be performed based on 1-4 network packets P.

[Modified Embodiment 1-2]

In the above embodiment, the filter information INF stored in the storage part 23 is repeatedly rewritten every time the predetermined time period T has elapsed. However, it is also possible to change the predetermined time period T. In other words, it is also possible to change the rewrite period of the filter information INF. Specifically, for example, in one period in which the image forming apparatus is operating in the power saving mode M2, it is possible that one predetermined time period T is slightly longer than the retransmission interval T1, and a subsequent predetermined time period T is slightly shorter than the retransmission interval T1.

[Modified Embodiment 1-3]

In the above implementation, the determination control part 32 sets the predetermined time period T, which is the rewrite period of the filter information INF, to a time period that is about the same as the retransmission interval T1. However, the present invention is not limited to this. In the following, an image forming apparatus 10C according to the present modified embodiment is described in detail.

Similar to the above-described image forming apparatus 10 (FIG. 2), the image forming apparatus 10C has a control part 30C. The control part 30C has a determination control part 32C. Based on information about the transmission interval T1 supplied from the packet transmitting and receiving part 33, the determination control part 32C sets the predetermined time period T to a time period that is twice the retransmission interval T1.

Figure 11:
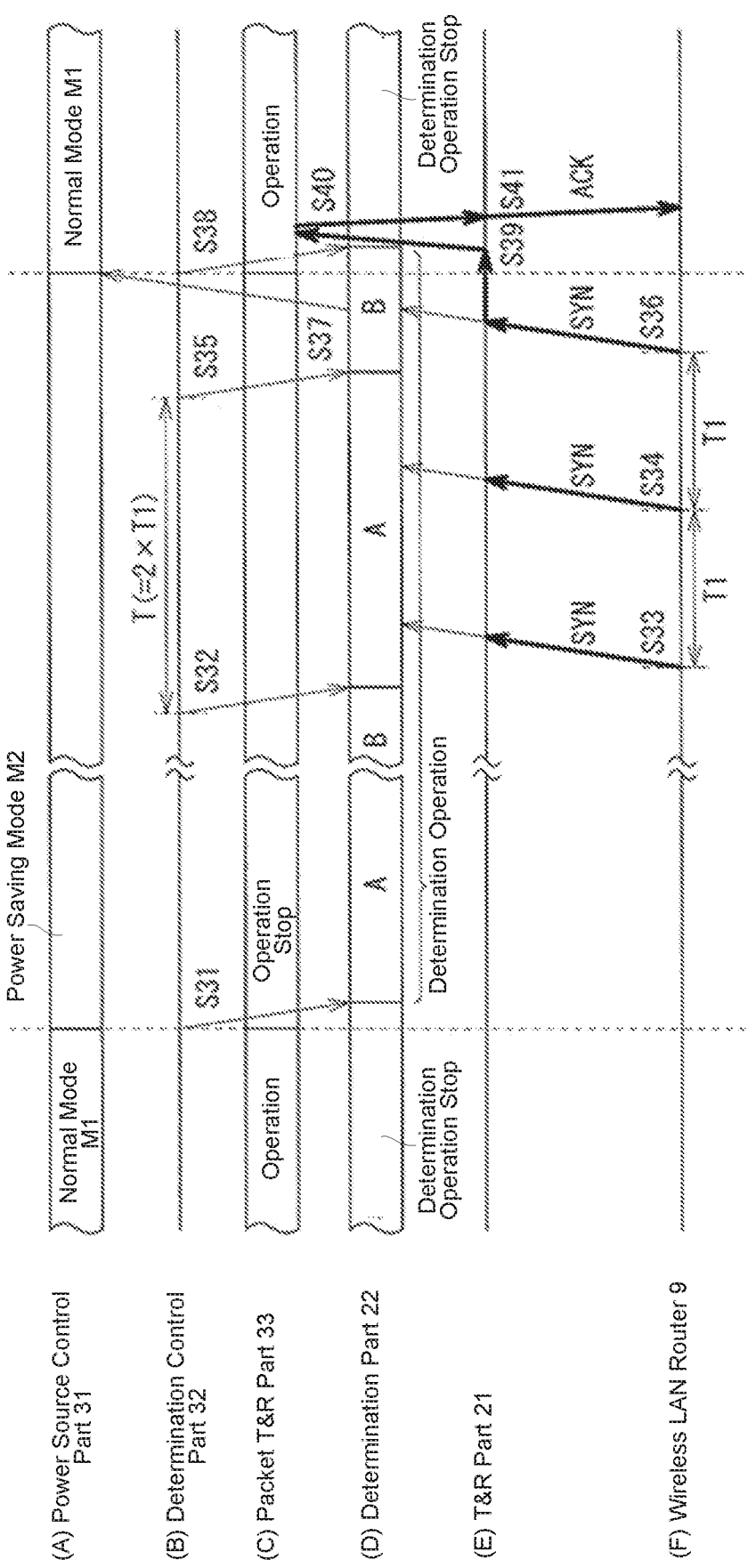
FIG. 11 is a timing diagram illustrating an operation example of an image forming apparatus according to a modified embodiment of the first embodiment.

FIG. 11 illustrates an operation example of the image forming apparatus 10C according to the present modified embodiment.

When the power supply control part 31 causes the power supply mode M to transition from the normal mode M1 to the power saving mode M2, the determination control part 32C causes the determination part 22 to start a determination operation and writes the filter information A as the filter information INF to the storage part 23 of the determination part 22 (Step S31). Then, the determination control part 32C alternately and repeatedly writes the filter information A and the filter information B as the filter information INF to the storage part 23.

Then, at a certain timing, the determination control part 32C writes the filter information A as the filter information INF to the storage part 23 of the determination part 22 (Step S32).

Next, the wireless LAN router 9 transmits a network packet P (SYN in FIG. 11), which is transmitted from the information processing device 8 and performs a print request using LPR, to the image forming apparatus 10C (Step S33). The transmitting and receiving part 21 receives this network packet P, and the determination part 22 determines whether or not this network packet P corresponds to one of the plurality of filter settings FIL included in the filter information INF (in this example, the filter information A). As illustrated in FIG. 6A, the filter information A does not contain a filter setting FIL related to the print request using LPR. Therefore, since the received network packet P does not correspond to any one of the plurality of filter settings FIL contained in the filter information A, the transmitting and receiving part 21 discards this network packet P.

Next, the wireless LAN router 9 retransmits the network packet P (SYN) that performs a print request using LPR at a timing separated by the transmission interval T1 from the timing related to Step S33 (Step S34). The transmitting and receiving part 21 receives this network packet P, and the determination part 22 determines whether or not this network packet P corresponds to one of the plurality of filter settings FIL included in the filter information INF (in this example, the filter information A). Since the received network packet P does not correspond to any one of the plurality of filter settings FIL contained in the filter information A, the transmitting and receiving part 21 discards this network packet P.

Next, when the predetermined time period T has elapsed since the timing related to Step S32, the determination control part 32C writes the filter information B as the filter information INF to the storage part 23 of the determination part 22 (Step S35).

Next, the wireless LAN router 9 retransmits the network packet P (SYN) that performs a print request using LPR at a timing separated by the transmission interval T1 from the timing related to Step S34 (Step S36). The transmitting and receiving part 21 receives this network packet P, and the determination part 22 determines whether or not this network packet P corresponds to one of the plurality of filter settings FIL included in the filter information INF (in this example, the filter information B). As illustrated in FIG. 6B, the filter information B contains a filter setting FIL related to the print request using LPR. Therefore, transmitting and receiving part 21 keeps this network packet P without discarding the network packet P. Then, the determination part 22 generates an interrupt signal SIG and supplies this interrupt signal SIG to the power supply control part 31 (Step S37). Based on this interrupt signal SIG, the power supply control part 31 causes the power supply mode M to transition from the power saving mode M2 to the normal mode M1. As a result, the main power supply part 11M starts generating the power-supply power PM, and, for example, the packet transmitting and receiving part 33, the image forming control part 34, and the image forming part 12 start to operate based on the power-supply power PM. The subsequent operation is the same as in the case of the above embodiment (FIGS. 9 and 10).

In this way, in the image forming apparatus 10C, the predetermined time period T is set to a time period that is twice the transmission interval T1. Therefore, as described below, it is possible to reduce a risk that a network packet P is discarded a plurality of times in succession.

Figure 12:
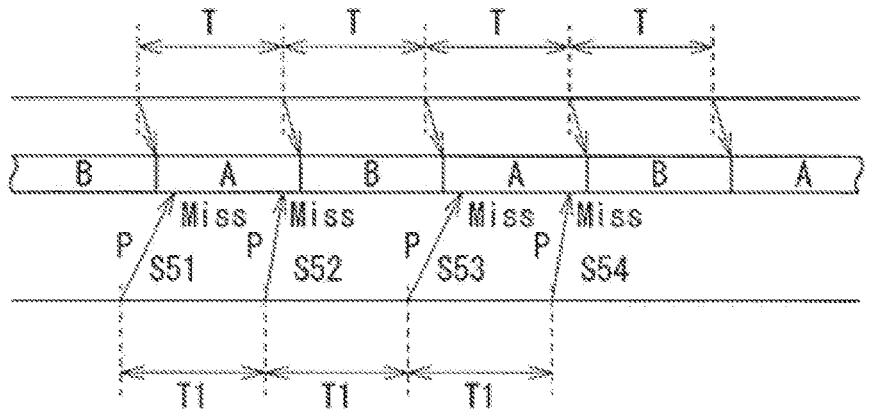
FIG. 12 is a timing diagram illustrating an operation example of an image forming apparatus according to one embodiment.
Figure 13:
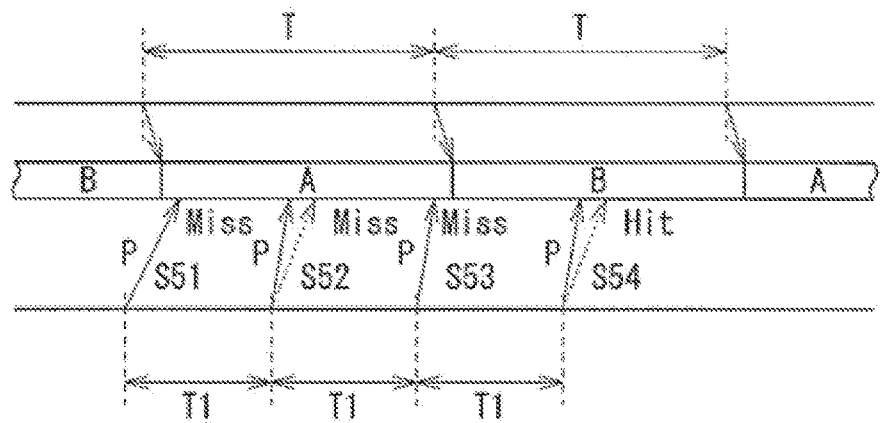
FIG. 13 is a timing diagram illustrating an operation example of an image forming apparatus according to the modified embodiment of the first embodiment.

FIG. 12 illustrates an operation example of the image forming apparatus 10 according to the above embodiment. FIG. 13 illustrates an operation example of the image forming apparatus 10C according to the present modified embodiment. In FIG. 12, the predetermined time period T is set to a time period about the same as the transmission interval T1. In FIG. 13, the predetermined time period T is set to a time period that is twice the transmission interval T1. The image forming apparatus 10, 10C has received a network packet P that performs a print request using LPR.

Even when the wireless LAN router 9 retransmits the network packet P at the retransmission interval T1, the reception timing at the image forming apparatus 10, 10C may be shifted. For example, in this example, the wireless LAN router 9 transmits the network packet P four times by performing retransmission three times. In this example, the reception timing of the first network packet P (Step S51) is too late; the reception timing of the second network packet P (Step S52) is too early; the reception timing of the third network packet P (Step S53) is too late; and the reception timing of the fourth network packet P (Step S54) is too early.

In the example of the image forming apparatus 10 according to the above embodiment (FIG. 12), the predetermined time period T is set to a time period that is about the same as the transmission interval T1. Therefore, in this example, the image forming apparatus 10 receives these four network packets P during time periods in which the filter information A is written, and these four network packets P are all discarded.

On the other hand, in the example of the image forming apparatus 10C according to the present modified embodiment (FIG. 13), the predetermined time period T is set to a time period that is twice the transmission interval T1. Therefore, in this example, the image forming apparatus 10C can receive the fourth network packet P during a time period in which the filter information B is written, and thus, can return to the normal mode M1.

Further, in a short time period (dead time) including the timing when the filter information INF is rewritten, the determination part 22 may not be able to perform a determination operation. As illustrated in FIG. 13, in the image forming apparatus 10C, the reception timing of the second network packet P (Step S52) is positioned near the center of the time period during which the filter information A is written, and the reception timing of the fourth network packet P (Step S54) is positioned near the center of the time period during which the filter information B is written. Therefore, the image forming apparatus 10C is not affected by the dead time. In particular, as illustrated in FIG. 13, even when the reception timing of the network packet P shifts, the image forming apparatus 10C is not affected by the dead time. As a result, the image forming apparatus 10C can stably return to the normal mode M1 without being affected by the dead time.

In this way, in the image forming apparatus 10C, the predetermined time period T, which is the rewrite period of the filter information INF, is set to a time period that is twice the retransmission interval T1. Therefore, it is possible to reduce a risk that a network packet P is discarded a plurality of times in succession.

[Modified Embodiment 1-4]

In the above embodiment, the determination control part 32 sets the predetermined time period T, which is the rewrite period of the filter information INF, based on the retransmission interval T1. However, the present invention is not limited to this. It is also possible that the predetermined time period T is set further based on the number of network packets P that can be retransmitted. In the following, an image forming apparatus 10D according to the present modified embodiment is described in detail.

Similar to the above-described image forming apparatus 10 (FIG. 2), the image forming apparatus 10D has a control part 30D. The control part 30D has a packet transmitting and receiving part 33D and a determination control part 32D.

In the normal mode M1, the packet transmitting and receiving part 33D has a function of causing a network packet P to be retransmitted and detecting a time interval (retransmission interval T1) between the first network packet P and the retransmitted second network packet P, and detecting the number of network packets P that can be retransmitted (the retransmission number N).

Based on information about the transmission interval T1 supplied from the packet transmitting and receiving part 33 and the retransmission number N, the determination control part 32D sets the predetermined time period T to a time period that is twice the retransmission interval T1.

Figure 14:
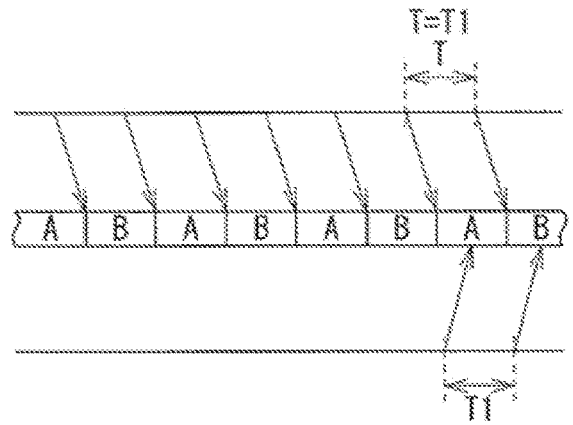
FIG. 14 is a timing diagram illustrating an operation example of an image forming apparatus according to another modified embodiment of the first embodiment.

FIG. 14 illustrates an operation example of the image forming apparatus 10D in a case where the retransmission number N is 1. In this example, since the retransmission number N is 1, the image forming apparatus 10D receives as most 2 network packets P in total. In this case, the determination control part 32D sets the predetermined time period T, which is the rewrite period of the filter information INF, to the retransmission interval T1. As a result, the image forming apparatus 10D can return to the normal mode M1 based on 1-2 network packets P.

Figure 15:
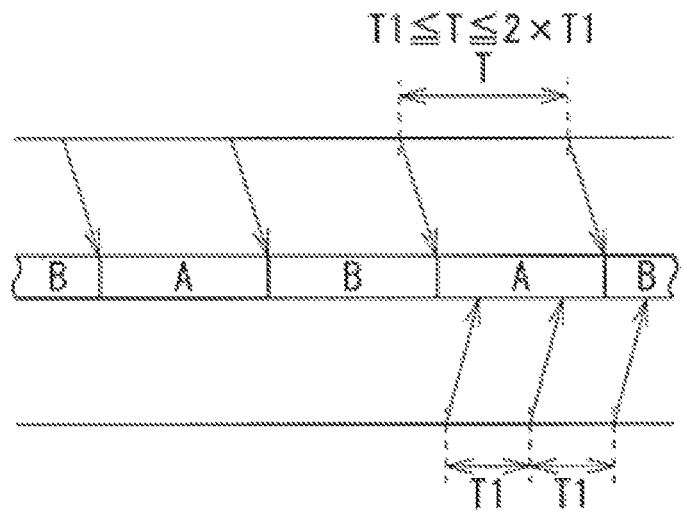
FIG. 15 is a timing diagram illustrating another operation example of the image forming apparatus according to the other modified embodiment of the first embodiment.

FIG. 15 illustrates an operation example of the image forming apparatus 10D in a case where the retransmission number N is 2. In this example, since the retransmission number N is 2, the image forming apparatus 10D receives as most 3 network packets P in total. In this case, the determination control part 32D sets the predetermined time period T, which is the rewrite period of the filter information INF, to a time period ($T1 \leq T \leq 2 \times T1$) that is equal to or larger than the retransmission interval T1 and equal to or less than twice the retransmission interval T1. As a result, the image forming apparatus 10D can return to the normal mode M1 based on 1-3 network packets P.

Figure 16:
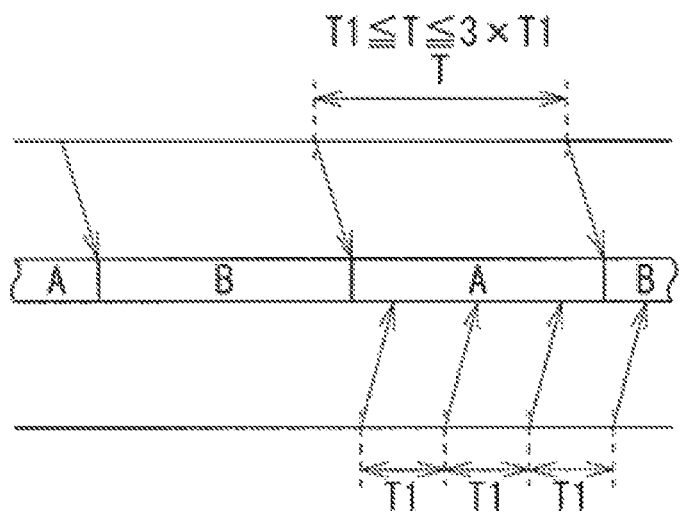
FIG. 16 is a timing diagram illustrating another operation example of the image forming apparatus according to the other modified embodiment of the first embodiment.

FIG. 16 illustrates an operation example of the image forming apparatus 10D in a case where the retransmission number N is 3. In this example, since the retransmission number N is 3, the image forming apparatus 10D receives as most 4 network packets P in total. In this case, the determination control part 32D sets the predetermined time period T, which is the rewrite period of the filter information INF, to a time period ($T1 \leq T \leq 3 \times T1$) that is equal to or larger than the retransmission interval T1 and equal to or less than three times the retransmission interval T1. As a result, the image forming apparatus 10D can return to the normal mode M1 based on 1-4 network packets P.

[Modified Embodiment 1-5]

In the above implementation, the determination control part 32 writes all the 8 filter settings FIL contained in the filter information A as the filter information INF to the storage part 23 or writes all the 8 filter settings FIL contained in the filter information B as the information INF to the storage part 23. However, the present invention is not limited to this. Instead of this, for example, it is also possible that the storage part 23 keeps the 5 filter settings FIL for HTTP, Bonjour, SNMP, NBT, and DHCP contained in both the filter information A and the filter information B. Then, the determination control part 32 may write the 3 filter settings FIL for HTTP, HTTPS and FTP, which are among the 8 filter settings FIL contained in the filter information A and are not contained in the filter information B, to the storage part 23, or may write the 3 filter settings FIL for Telnet, LPR, and RAW, which are among the 8 filter settings FIL contained in the filter information B and are not contained in the filter information A, to the storage part 23.

[Other Modified Embodiments]

Further, two or more of these modified embodiments may be combined.

<2. Second Embodiment>

Next, an image forming apparatus 40 according to a second embodiment is described. The present embodiment differs from the first embodiment in a method for preparing a plurality of filter information sets to be written to the storage part 23. That is, in the above first embodiment (FIG. 2), the firmware includes a plurality of filter information sets (the filter information A and the filter information B). However, instead of this, in the present embodiment, the control part generates a plurality of filter information sets. A configuration component that is substantially the same as in the image forming apparatus 10 according to the first embodiment is indicated using the reference numeral symbol, and description thereof is omitted as appropriate.

As illustrated in FIG. 1, an image forming system 2 includes the image forming apparatus 40.

Figure 17:
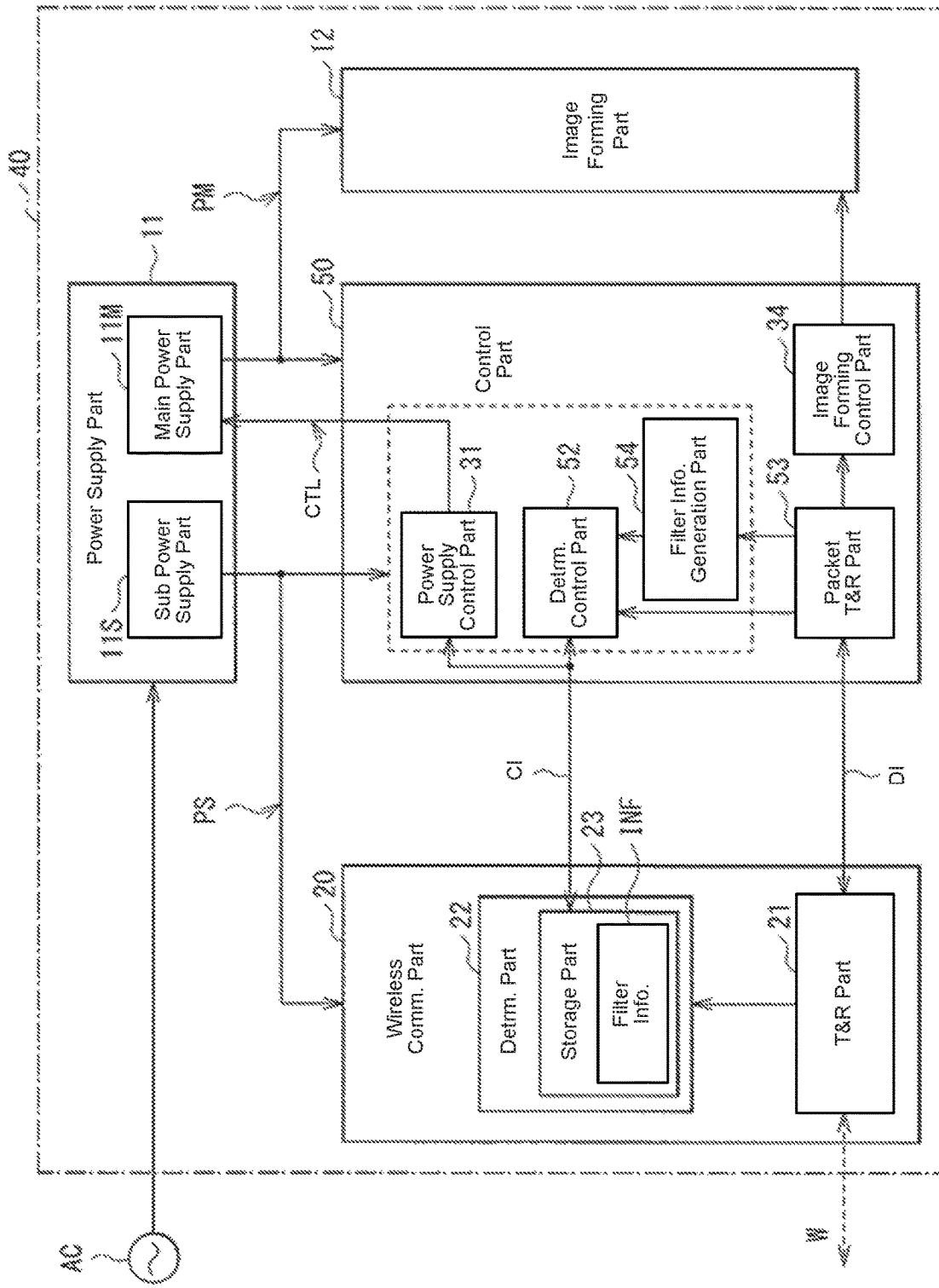
FIG. 17 is a block diagram illustrating a configuration example of an image forming apparatus according to a second embodiment.

FIG. 17 illustrates a configuration example of the image forming apparatus 40. The image forming apparatus 40 includes a control part 50. The control part 50 includes a packet transmitting and receiving part 53, a filter information generation part 54 (as "Filter Info. Generation Part"), and a determination control part 52. The power supply control part 31, the filter information generation part 54, and the determination control part 52 are configured to operate based on the supplied power-supply power PS in both the normal mode M1 and the power saving mode M2. The packet transmitting and receiving part 53 and the image forming control part 34 are configured to operate based on the supplied power-supply power PM in the normal mode M1 and to stop operating in the power saving mode M2.

Similar to the packet transmitting and receiving part 33 according to the first embodiment above, the packet transmitting and receiving part 53 is configured to perform exchange of network packets P via the data interface DI with the transmitting and receiving part 21 of the wireless communication part 20 in the normal mode M1. Further, similar to the packet transmitting and receiving part 33 according to the first embodiment, the packet transmitting and receiving part 53 detects a time interval (the retransmission interval T1) of reception times of network packets P when a network packet P is retransmitted. Further, the packet transmitting and receiving part 53 also has a function of supplying a received network packet P to the filter information generation part 54.

The filter information generation part 54 is configured to confirm a type of a network packet P based on the network packet P which is supplied from the packet transmitting and receiving part 53, and to generate, based on the type of the network packet P, four filter information sets, filter information A, filter information B, filter information C and filter information D. Specifically, the filter information generation part 54 performs a packet analysis during a predetermined time period in which the image forming apparatus is operating in the normal mode M1, and counts the number of received network packets P for each type of the network packets P, and thereby, obtains a reception frequency of network packets P for each type of the network packets P. The predetermined time period is desirably a most recent time period (for example, the current day). Further, when the predetermined time period includes a most recent time period (for example, the current day) and an old time period (for example, the previous day), it is desirable to increase a weight of the most recent time period with respect to an aggregated result. Then, the filter information generation part 54 generates four filter information sets, the filter information A, the filter information B, the filter information C and the filter information D, based on the reception frequency for each type of the network packets P. Specifically, the filter information generation part 54 generates the four filter information sets (the filter information A, the filter information B, the filter information C and the filter information D) such that a type of network packets P for which the reception frequency is higher is more frequently determined by the determination part 22.

The determination control part 52 is configured to control the operation of the determination part 22 in the wireless communication part 20. Specifically, the determination control part 52 repeatedly writes, in predetermined writing order OD, the four filter information sets (the filter information A, the filter information B, the filter information C and the filter information D) as the filter information INF to the storage part 23 every time the predetermined time period T has elapsed.

FIG. 18 shows a list of network packets P for which, when being received by the image forming apparatus 40, the power supply mode M should transition from the power saving mode M2 to the normal mode M1. In this example, when the image forming apparatus 40 receives any one of 13 types (ICMP, Bonjour, SNMP, NBT, DHCP, LPR, HTTP, HTTPS, RAW, FTP, Telnet, WSD, IPP) of network packets P, it is desirable that the power supply mode M transition from the power saving mode M2 to the normal mode M1. Here, WSD is Web Services on Devices, and IPP is Internet Printing Protocol.

The determination part 22 uses the filter settings FIL to determine whether or not a network packet P received by the transmitting and receiving part 21 is one of these 13 types of network packets P.

As shown in FIG. 18, there are 13 types of network packets P to be determined by the determination part 22. On the other hand, the number of the filter settings FIL that can be stored in the storage part 23 is restricted to 8. Therefore, in the image forming apparatus 40, the four filter information sets (the filter information A, the filter information B, the filter information C and the filter information D) are prepared, and the determination control part 52 repeatedly writes these four filter information sets (the filter information A, the filter information B, the filter information C and the filter information D) in a predetermined writing order OD as the filter information INF to the storage part 23 every time the predetermined time period T has elapsed.

The filter information generation part 54 generates, in this example, the four filter information sets (the filter information A, the filter information B, the filter information C and the filter information D) based on network packets P supplied from the packet transmitting and receiving part 53. Specifically, the filter information generation part 54 generates the four filter information sets (the filter information A, the filter information B, the filter information C and the filter information D) such that, for a type of network packets P for which the reception frequency is higher, the number of filter information sets among the four filter information sets (the filter information A, the filter information B, the filter information C and the filter information D) containing a filter setting FIL corresponding to this type is larger.

FIG. 19 illustrates an operation example of the filter information generation part 54. In this example, the image forming apparatus 40 receives each network packet P the number of times indicated in the "reception number" column. The filter information generation part 54 sets a priority for each network packet P based on the reception number. In this example, four priorities PR1-PR4 are provided. The priority PR1 is the highest priority, and the priority PR4 is the lowest priority.

The filter information generation part 54 sets the priority for ICMP, Bonjour, SNMP, NBT and DHCP to the priority PR1 regardless of the reception number. That is, the layer 3 protocol type (Prot) of these network packets P is ICMP or UDP, and is a protocol that does not perform retransmission. Therefore, when the image forming apparatus 40 fails to receive a network packet P of these types, the image forming apparatus 40 cannot receive the same network packet P again. Therefore, the filter information generation part 54 sets the priority for these types of network packets P to the priority PR1. Further, the filter information generation part 54 sets priorities to the priorities PR2, PR3, and PR4 in a descending order of the reception number. Then, the filter information generation part 54 generates the four filter information sets (the filter information A, the filter information B, the filter information C and the filter information D) based on the priorities set in this way.

FIG. 20A illustrates an example of the filter information A; FIG. 20B illustrates an example of the filter information B; FIG. 20C illustrates an example of the filter information C; and FIG. 20D illustrates an example of the filter information D. In FIG. 19, as indicated using "◯", the filter information A contains 8 filter settings FIL for ICMP, Bonjour, SNMP, NBT, DHCP, LPR, HTTP, and HTTPS; the filter information B contains 8 filter settings FIL for ICMP, Bonjour, SNMP, NBT, DHCP, LPR, HTTP, and RAW; the filter information C contains 8 filter settings FIL for ICMP, Bonjour, SNMP, NBT, DHCP, LPR, FTP, and Telnet; and the filter information D contains 8 filter settings FIL for ICMP, Bonjour, SNMP, NBT, DHCP, HTTP, WSD, and IPP.

FIG. 21 illustrates an example of the writing order OD of the four filter information sets (the filter information A, the filter information B, the filter information C and the filter information D). In this example, the determination control part 52 repeatedly writes the filter information A, the filter information B, the filter information C and the filter information D to the storage part 23 in a cyclic order of " . . . ABABCABABD . . . ". That is, in this example, the filter information A, the filter information B, the filter information C and the filter information D are written to the storage part 23 with a period of 10 turns. In FIG. 21, as indicated using "0", network packets P for which the priority is set to the priority PR1 can be determined in all the 10 turns. Further, network packets P for which the priority is set to the priority PR2 can be determined in 9 turns out of 10 turns. Further, network packets P for which the priority is set to the priority PR3 can be determined in 4 turns out of 10 turns. Further, network packets P for which the priority is set to the priority PR4 can be determined in 1 turn out of 10 turns.

Here, the determination control part 52 corresponds to a specific example of "a determination control part" in the present invention. The packet transmitting and receiving part 53 corresponds to a specific example of "a packet transmitting and receiving part" in the present invention. The filter information generation part 54 corresponds to a specific example of "a generation part" in the present invention. The filter information A, the filter information B, the filter information C and the filter information D correspond to a specific example of "a plurality of filter information sets" in the present invention. The writing order OD corresponds to a specific example of "a predetermined order" in the present invention.

Figure 22:
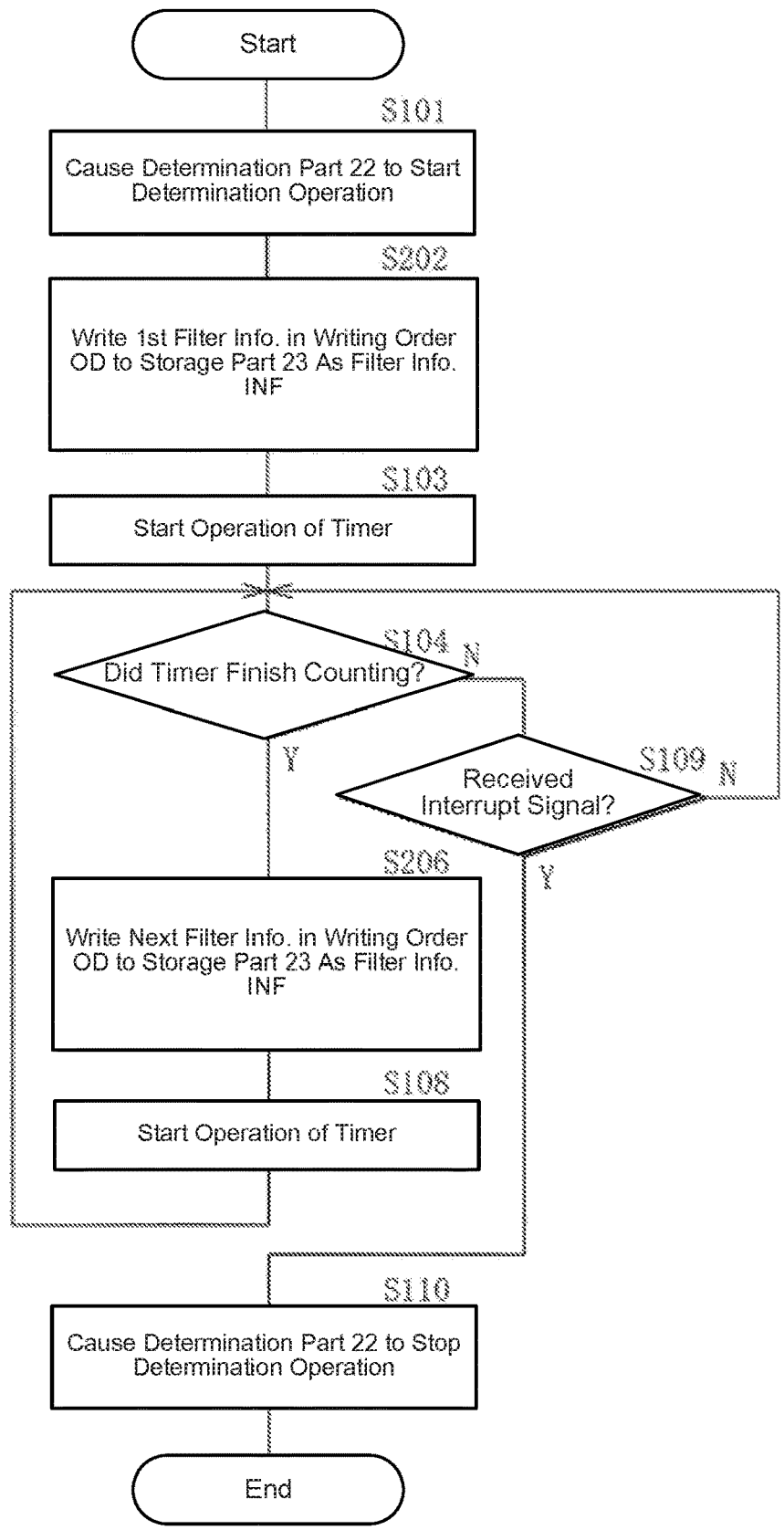
FIG. 22 is a flow diagram illustrating an operation example of the image forming apparatus illustrated in FIG. 17.

FIG. 22 illustrates an operation example of the determination control part 52 in the power saving mode M2.

First, when the power supply mode M transitions from the normal mode M1 to the power saving mode M2, the determination control part 52 causes the determination part 22 to starts a determination operation (Step S101).

Next, the determination control part 52 writes the first filter information (the filter information A in this example) in the writing order OD as filter information INF to the storage part 23 of the determination part 22 (Step S202).

Next, the determination control part 52 starts an operation of a timer (Step S103).

Next, the determination control part 52 confirms whether or not the timer has finished counting a predetermined count corresponding to the predetermined time period T (Step S104).

In Step S104, when the timer has finished counting ("Y" in Step S104), the determination control part 52 writes the next filter information in the writing order OD as filter information INF to the storage part 23 of the determination part 22 (Step S206). Next, the determination control part 52 starts an operation of the timer (Step S108). Then, the process returns to Step S104.

Further, in Step S104, when the timer has not finished counting ("N" in Step S104), the determination control part 52 confirms whether or not the power supply control part 31 has received an interrupt signal SIG from the determination part 22 (Step S109). When the power supply control part 31 has not received an interrupt signal SIG ("N" in Step S109), the process returns to Step S104.

In Step S109, when the power supply control part 31 has received an interrupt signal SIG ("Y" in Step S109), the determination control part 52 causes the determination part 22 to stop the determination operation (Step S110).

As a result, this flow is terminated.

Next, the operation of the image forming apparatus 40 is described in detail using a specific example.

Figure 23:
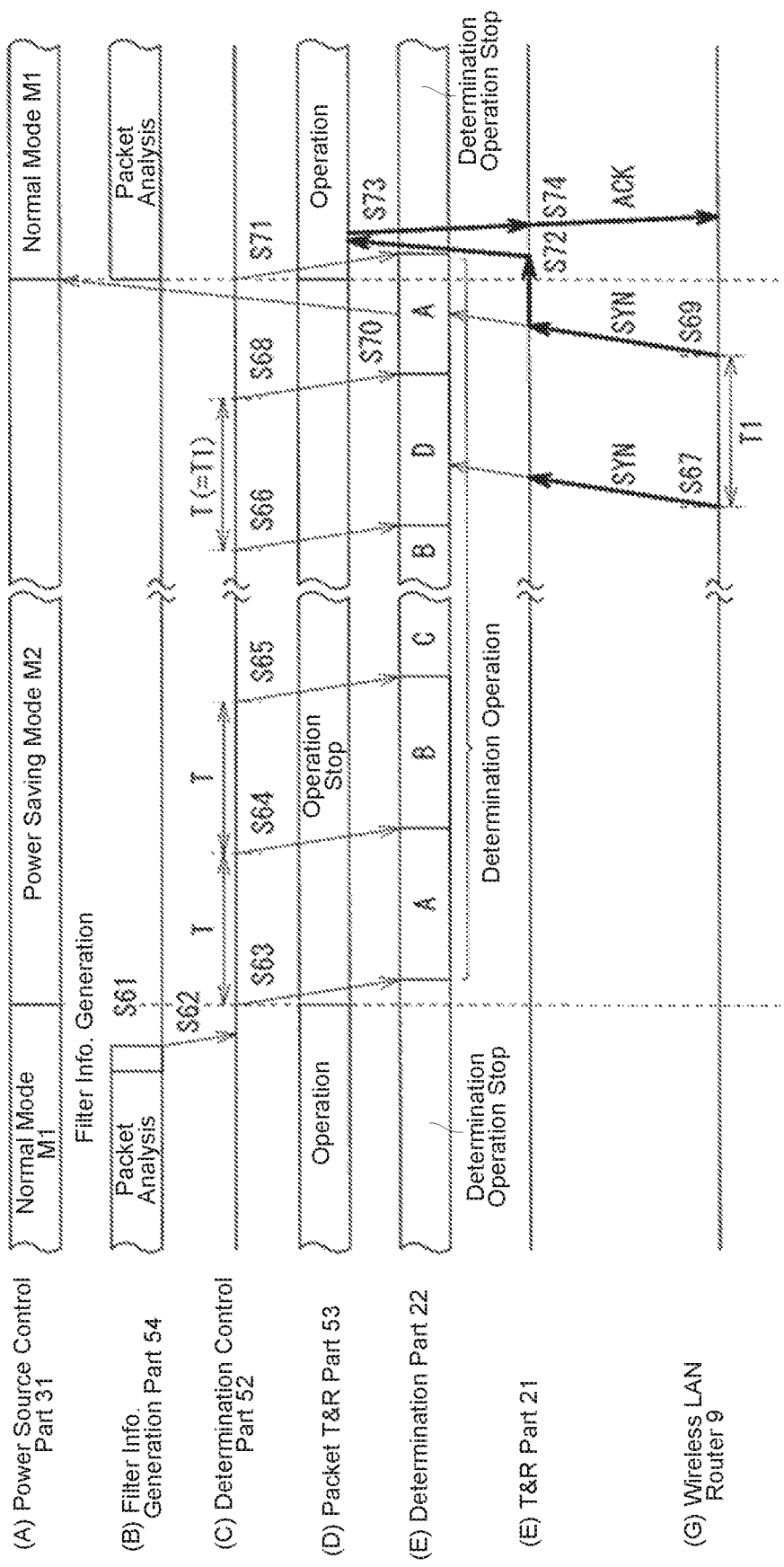
FIG. 23 is a timing diagram illustrating an operation example of the image forming apparatus illustrated in FIG. 17.

FIG. 23 illustrates an example of an operation of returning to the normal mode M1 in the image forming apparatus 40: (A) illustrates an operation of the power supply control part 31; (B) illustrates an operation of the filter information generation part 54; (C) illustrates an operation of the determination control part 52; (D) illustrates an operation of the packet transmitting and receiving part 53; (E) illustrates an operation of the determination part 22; (F) illustrates an operation of the transmitting and receiving part 21; and (G) illustrates an operation of the wireless LAN router 9. In this example, during a time period in which the image forming apparatus 40 is operating in the power saving mode M2, the information processing device 8 transmits a network packet P that performs a print request using LPR to the image forming apparatus 40 via the wireless LAN router 9. The image forming apparatus 40 returns to the normal mode M1 based on this network packet P. In the following, this operation is described in detail.

When the power supply control part 31 causes the power supply mode M to transition from the normal mode M1 to the power saving mode M2, prior to the transition, the filter information generation part 54 generates the four filter information sets (the filter information A, the filter information B, the filter information C and the filter information D) based on a result of a packet analysis (Step S61). Then, the filter information generation part 54 supplies the generated filter information A, filter information B, filter information C and filter information D to the determination control part 52 (Step S62).

Then, when the power supply control part 31 causes the power supply mode M to transition from the normal mode M1 to the power saving mode M2, the determination control part 52 causes the determination part 22 to start a determination operation and writes the first filter information (the filter information A in this example) in the writing order OD as the filter information INF to the storage part 23 of the determination part 22 (Step S63).

Then, when the predetermined time period T has elapsed, the determination control part 52 writes the next filter information (the filter information B in this example) in the writing order OD as the filter information INF to the storage part 23 of the determination part 22 (Step S64). Similarly, when the predetermined time period T has elapsed, the determination control part 52 writes the next filter information (the filter information A in this example) in the writing order OD as the filter information INF to the storage part 23 of the determination part 22 (Step S65). In this way, the determination control part 52 repeatedly writes the filter information A, the filter information B, the filter information C and the filter information D in the writing order OD as the filter information INF to the storage part 23.

Then, at a certain timing thereafter, the determination control part 52 writes the next filter information (the filter information D in this example) in the writing order OD as the filter information INF to the storage part 23 of the determination part 22 (Step S66).

Next, the wireless LAN router 9 transmits a network packet P (SYN in FIG. 23), which is transmitted from the information processing device 8 and performs a print request using LPR, to the image forming apparatus 40 (Step S67). The transmitting and receiving part 21 receives this network packet P, and the determination part 22 determines whether or not this network packet P corresponds to one of the plurality of filter settings FIL included in the filter information INF (in this example, the filter information D). As illustrated in FIG. 20D, the filter information D does not contain a filter setting FIL related to the print request using LPR. Therefore, since the received network packet P does not correspond to any one of the plurality of filter settings FIL contained in the filter information D, the transmitting and receiving part 21 discards this network packet P.

Next, when the predetermined time period T has elapsed since the timing related to Step S66, the determination control part 52 writes the next filter information (the filter information A in this example) in the writing order OD as the filter information INF to the storage part 23 of the determination part 22 (Step S68).

Next, the wireless LAN router 9 retransmits the network packet P (SYN) that performs a print request using LPR at a timing separated by the transmission interval T1 from the timing related to Step S67 (Step S69). The transmitting and receiving part 21 receives this network packet P, and the determination part 22 determines whether or not this network packet P corresponds to one of the plurality of filter settings FIL included in the filter information INF (in this example, the filter information A). As illustrated in FIG. 20A, the filter information A contains a filter setting FIL related to the print request using LPR. Therefore, transmitting and receiving part 21 keeps this network packet P without discarding the network packet P. Then, the determination part 22 generates an interrupt signal SIG and supplies this interrupt signal SIG to the power supply control part 31 (Step S70). Based on this interrupt signal SIG, the power supply control part 31 causes the power supply mode M to transition from the power saving mode M2 to the normal mode M1. As a result, the main power supply part 11M starts generating the power-supply power PM, and, for example, the packet transmitting and receiving part 53, the image forming control part 34, and the image forming part 12 start to operate based on the power-supply power PM. The subsequent operation is the same as that in the case of the image forming apparatus 10 according to the first embodiment (FIG. 9).

In the image forming apparatus 40, as illustrated in FIG. 21, a network packet P that performs a print request using LPR can be determined in 9 turns out of 10 turns. In other words, when this network packet P is retransmitted, the image forming apparatus 40 can return to the normal mode M1 by receiving the network packet P 1.1 times on average.

In FIG. 23, the image forming apparatus 40 is described using an example in which a network packet P that performs a print request using LPR is received. However, the same applies also to other types of network packets P.

For example, in the image forming apparatus 40, a network packet P that performs a file transfer request using FTP can be determined in 1 turn out of 10 turns. In other words, when this network packet P is retransmitted, the image forming apparatus 40 can return to the normal mode M1 by receiving the network packet P 4.5 times on average. Therefore, in the image forming apparatus 40, the possibility that this network packet P is discarded is high. However, in this example, as illustrated in FIG. 19, the reception frequency of this network packet P is low, and thus, it has almost no effect.

In this way, in the image forming apparatus 40, in the power saving mode M2, the determination control part 52 repeatedly rewrites the filter information INF stored in the storage part 23 every time the predetermined time period T has elapsed. Therefore, the wireless communication part 20 can determine the returning to the normal mode M1. As a result, the image forming apparatus 40 can stop the power supply to the packet transmitting and receiving part 33 in the power saving mode M2. Therefore, similar to the case of the above first embodiment, power consumption can be reduced.

Further, in the image forming apparatus 40, the filter information A, the filter information B, the filter information C and the filter information D are repeatedly written as the filter information INF to the storage part 23 every time the predetermined time period T has elapsed. As a result, in the image forming apparatus 40, the restriction on the number of the filter settings FIL used in a determination operation can be relaxed. Specifically, in this example, the number of the filter settings FIL that can be stored in the storage part 23 is restricted to 8, whereas the number of the filter settings FIL used in determination operations can be 13. As a result, in the image forming apparatus 40, returning to the normal mode M1 can be performed based on more types of network packets P.

Further, in the image forming apparatus 40, the filter information generation part 54 obtains a reception frequency of network packets P for each type of network packets P, and the determination control part 52 generates four filter information sets (the filter information A, the filter information B, the filter information C and the filter information D) based on the reception frequency for each type of network packets P. As a result, in the image forming apparatus 40, a type of network packets P for which the reception frequency is higher can be more frequently determined by the determination part 22. Therefore, in the image forming apparatus 40, the retransmission number of a network packet P of a type for which the reception frequency is high can be reduced, and the image forming apparatus 40 can return to the normal mode M1 in a short time.

As described above, in the present embodiment, a reception frequency of network packets is obtained for each type of network packets, and four filter information sets are generated based on the reception frequency for each type of network packets. As a result, a type of network packets P for which the reception frequency is higher can be more frequently determined by the determination part. As a result, the retransmission number of a network packet P of a type for which the reception frequency is high can be reduced, and the image forming apparatus can return to the normal mode M1 in a short time. The other effects are the same as in the case of the above first embodiment.

[Modified Embodiment 2-1]

In the above embodiment, as illustrated in FIG. 19, a filter setting FIL for a network packet P for which the reception number is 0 is included in one of the four filter information sets (the filter information A, the filter information B, the filter information C and the filter information D). However, the present invention is not limited to this. Instead of this, it is also possible that a filter setting FIL for a network packet P for which the reception number is 0 is not included in any one of the four filter information sets (the filter information A, the filter information B, the filter information C and the filter information D). In this case, it is possible that, when the image forming apparatus 40 is operating in the power saving mode M2, even when such a network packet P is received, the image forming apparatus 40 does not return to the normal mode M1 based on this network packet P.

[Modified Embodiment 2-2]

The modified embodiments of the first embodiment may also be applied to the image forming apparatus 40 according to the second embodiment.

In the above, the present technology has been described by illustrating a few embodiments and modified embodiments. However, the present technology is not limited to these embodiments and the like, and various modifications are possible.

For example, in the above embodiments and the like, the present technology is applied to a wireless LAN. However, the present invention is not limited to this. For example, instead of a wireless LAN, the present invention may also be applied to a wired LAN.

For example, in the above embodiments and the like, the determination control part sets the predetermined time period T based on the information about the transmission interval T1 supplied from the packet transmitting and receiving part. However, the present invention is not limited to this. For example, the predetermined time period T may be set to a predetermined fixed time period. This predetermined time period T can be set to, for example, 3 seconds.

For example, in the above embodiments and the like, the network packets P that are illustrated in FIGS. 4 and 18 and are triggers for the returning to the normal mode M1 are examples, and other types of network packets P may also be used.

For example, in the above embodiments and the like, the present technology is applied to a single-function printer. However, the present invention is not limited to this. Instead of this, for example, the present invention may also be applied to a so-called multi-function peripheral (MFP) having a copy function, a fax function, a scan function, a print function, and the like.

What is claimed is:

1. An image forming apparatus, comprising:
a power supply part that supplies electronic power in a power mode that is chosen from two different power modes that are a first mode and a second mode wherein a power consumption in the second mode is smaller than a power consumption in the first mode,
a communication part that includes:
a transmitting and receiving part that receives a network packet in both the first mode and the second mode; and
a determination part that
stores filter information containing a plurality of filter settings and
determines whether or not the network packet, which is received by the transmitting and receiving part in the second mode, matches one of the plurality of filter settings, creating a determination result;
a determination control part that performs a rewrite operation to repeatedly rewrite the filter information in the determination part while running in the second mode;
a power supply control part that transits the power mode of the power supply part from the second mode to the first mode based on the determination result of the determination part;
a packet transmitting and receiving part that
receives the network packet supplied from the transmitting and receiving part in the first mode and
stops an operation of itself in the second mode; and
an image forming part that
forms an image on a recording medium based on the network packet received by the packet transmitting and receiving part in the first mode and
stops an operation of itself in the second mode.

2. The image forming apparatus according to claim 1, wherein
the determination control part performs the rewrite operation every time when a predetermined time period has elapsed.

3. The image forming apparatus according to claim 1, wherein
the filter information is composed with at least two filter information sets that are a first filter information set and a second filter information set,
the first filter information set contains filter settings that are different from filter settings contained in the second filter information set,
the determination control part performs the rewrite operation by alternatively using one of the first and second filter information sets.

4. The image forming apparatus according to claim 2, wherein
the packet transmitting and receiving part, in the first mode, detects a time interval of reception times of the network packet when the network packet is retransmitted, and
the determination control part sets a length of the predetermined time period based on the time interval.

5. The image forming apparatus according to claim 4, wherein
the length of the predetermined time period is about the same as the time interval.

6. The image forming apparatus according to claim 4, wherein
the length of the predetermined time period is about twice as large as the time interval.

7. The image forming apparatus according to claim 4, wherein
the packet transmitting and receiving part, in the first mode, further detects a retransmission number indicating how many times the network packet has been retransmitted, and
the determination control part sets the length of the predetermined time period based on the time interval and the retransmission number.

8. The image forming apparatus according to claim 2, wherein
the determination control part is configured to change the length of the predetermined time period.

9. The image forming apparatus according to claim 2, wherein
the predetermined time period is fixed such that the predetermined time does not vary.

10. The image forming apparatus according to claim 1, wherein
the determination control part
stores a plurality of filter information sets, and
performs the rewrite operation by selecting one of the filter information sets in a predetermined order as the filter information and writing the filter information entirely or partially to the determination part.

11. The image forming apparatus according to claim 10, wherein the filter information sets are fixed such that the filter information sets do not vary.

12. The image forming apparatus according to claim 10, further comprising:
a generation part that generates the filter information sets.

13. The image forming apparatus according to claim 12, wherein
the filter information contains information about a packet type of the network packet, and
the generation part, in the first mode, generates the filter information sets based on a reception frequency of each packet type of the network packet received by the packet transmitting and receiving part.

14. The image forming apparatus according to claim 1, wherein
the power supply part is composed with a main power supply part and a sub power supply part,
the main power supply part is connected to the image forming part and is configured to supply the electronic power to the image forming part in the first mode and not to supply the electronic power to the image forming part in the second mode such that the image forming part does not form the image on the recording medium in the second mode,
the sub power supply part is connected to the communication part, the power supply control part, the determination control part and the packet transmitting and receiving part, and is configured to supply the electronic power to the communication part, the power supply control part, the determination control part and the packet transmitting and receiving part in both the first mode and the second mode such that the communication part receives the network packet in both the first mode and the second mode.

* * * * *